US011493322B2

(12) United States Patent
Hidaka

(10) Patent No.: US 11,493,322 B2
(45) Date of Patent: Nov. 8, 2022

(54) ELLIPSOMETER

(71) Applicant: SAMSUNG ELECTRONICS CO., LTD., Suwon-si (KR)

(72) Inventor: Yasuhiro Hidaka, Fujisawa (JP)

(73) Assignee: SAMSUNG ELECTRONICS CO., LTD.

( * ) Notice: Subject to any disclaimer, the term of this patent is extended or adjusted under 35 U.S.C. 154(b) by 37 days.

(21) Appl. No.: 17/350,987

(22) Filed: Jun. 17, 2021

(65) Prior Publication Data

US 2022/0003535 A1   Jan. 6, 2022

(30) Foreign Application Priority Data

Jul. 3, 2020 (JP) ................ JP2020-115685

(51) Int. Cl.
  *G01B 9/02* (2022.01)
  *G02B 5/30* (2006.01)
  (Continued)

(52) U.S. Cl.
  CPC ..... *G01B 9/02043* (2013.01); *G01B 9/02084* (2013.01); *G01B 11/0641* (2013.01);
  (Continued)

(58) Field of Classification Search
  CPC ............ G01B 9/02043; G01B 9/02084; G01B 2290/70; G01B 11/0641; G01N 21/211; G02B 27/283; G02B 27/288
  See application file for complete search history.

(56) References Cited

U.S. PATENT DOCUMENTS 5,181,080 A   1/1993 Fanton et al.
5,311,285 A * 5/1994 Oshige ................ G01N 21/211
                                                356/369

(Continued)

FOREIGN PATENT DOCUMENTS

JP   H05232384 A   9/1993
JP   H09504861 A   5/1997
(Continued)

OTHER PUBLICATIONS

Garcia-Caurel, Enric , et al., "Application of Spectroscopic Ellipsometry and Mueller Ellipsometry to Optical Characterization", Applied Spectroscopy, Jan. 1, 2013, 21 pp.
(Continued)

*Primary Examiner* — Michael A Lyons
(74) *Attorney, Agent, or Firm* — Myers Bigel, P.A.

(57) ABSTRACT

An ellipsometer includes a first separation unit configured to separate a first reflected light into two reflected lights, a first polarizing optical element configured to separate each of the two reflected lights into two linearly polarized lights, a first interference device configured to form an interference fringe by allowing components of the two linearly polarized lights to interfere with each other, a second separation unit configured to separate a second reflected light into two reflected lights, a second polarizing optical element configured to separate each of the two reflected lights into two linearly polarized lights, and a second interference device configured to form an interference fringe by allowing components of the two linearly polarized lights to interfere with each other.

20 Claims, 25 Drawing Sheets

(51) Int. Cl.
  *G02B 27/28* (2006.01)
  *G01N 21/21* (2006.01)
  *G01B 11/06* (2006.01)
(52) U.S. Cl.
  CPC .......... *G01N 21/211* (2013.01); *G02B 5/3025* (2013.01); *G02B 27/283* (2013.01); *G02B 27/288* (2013.01); *G01B 2290/70* (2013.01)

(56) References Cited

U.S. PATENT DOCUMENTS

| | | | |
|---|---|---|---|
| 5,335,066 | A * | 8/1994 | Yamada .............. G01N 21/211 356/369 |
| 5,412,473 | A | 5/1995 | Rosencwaig et al. |
| 5,420,717 | A | 5/1995 | Tabata |
| 5,596,411 | A | 1/1997 | Fanton et al. |
| 5,798,837 | A | 8/1998 | Aspnes et al. |
| 5,953,137 | A | 9/1999 | Sirat et al. |
| 6,317,259 | B1 | 11/2001 | Matsui |
| 6,856,384 | B1 | 2/2005 | Rovira |
| 7,616,323 | B2 | 11/2009 | De et al. |
| 7,667,841 | B2 | 2/2010 | Opsal |
| 8,908,180 | B2 | 12/2014 | Acher |
| 2002/0054290 | A1 * | 5/2002 | Vurens ................ G01J 4/04 356/369 |
| 2003/0002043 | A1 | 1/2003 | Abdulhalim et al. |
| 2004/0046959 | A1 * | 3/2004 | Meeks .............. G01N 21/211 356/369 |
| 2011/0102793 | A1 | 5/2011 | Straaijer |
| 2014/0168637 | A1 * | 6/2014 | Wan ................ G01N 21/45 356/73 |
| 2022/0003538 | A1 * | 1/2022 | Hidaka .............. G02B 27/286 |

FOREIGN PATENT DOCUMENTS

| | | |
|---|---|---|
| JP | 2001021810 A | 1/2001 |
| JP | 2007163296 A | 6/2007 |
| JP | 2021085698 A | 6/2021 |

OTHER PUBLICATIONS

Otani, Yukitoshi, "Spectroscopic Mueller Matrix Polarimetry", vol. 35, No. 9, Sep. 2014, pp. 510-515.

Tompkins, Harland G., et al., "Handbook of Ellipsometry", William Andrew publishing/Springer, 2005, 902 pp.

* cited by examiner $$I_{fringe1} = |E_P|^2 + |E_S|^2 + 2|E_P||E_S|\exp\{i(\delta_P - \delta_S)\}$$
$$= |E_P|^2 + |E_S|^2 + 2|E_P||E_S|\exp(i\Delta)$$

$$I_{fringe2} = 2|E_S|^2 + 2|E_S|^2\exp\{i(\delta_P - \delta_S)\}$$
$$= 2|E_S|^2 + 2|E_S|^2\exp(i\Delta)$$

$$I_{fringe3}=|E_S|^2+|E_{P+S}|^2+2|E_S||E_{P+S}|\exp\{i(\delta_S-\delta_{P+S})\}$$
$$=|E_S|^2+|E_{P+S}|^2+2|E_S||E_{P+S}|\exp(i\Delta_{S-PS})$$

$$I_{fringe4}=|E_P|^2+|E_{P+S}|^2+2|E_P||E_{P+S}|\exp\{i(\delta_P-\delta_{P+S})\}$$
$$=|E_P|^2+|E_{P+S}|^2+2|E_P||E_{P+S}|\exp(i\Delta_{P-PS})$$

ELLIPSOMETER

CROSS-REFERENCE TO RELATED APPLICATION

This application claims the benefit of Japanese Patent Application No. 2020-115685, filed on Jul. 3, 2020, in the Japanese Patent Office, the disclosure of which is incorporated herein in its entirety by reference.

BACKGROUND

The inventive concept relates to an ellipsometer. Ellipsometry was automated by researchers including Aspnes in 1975. Thereafter, the measurement time in ellipsometry has been reduced and the accuracy thereof has been increased. In addition, spectroscopic ellipsometry for measuring an object by using multiple wavelengths has been commercialized. In ellipsometry, dimensions, such as a film thickness, or optical integers, such as a refractive index, are determined with high precision through non-destructive measurement of a thin film or a microstructure, and thus, ellipsometry is widely used in semiconductor manufacturing processes. As an optical critical dimension (OCD) measuring technique for measuring dimensions of a microstructure in which the line width of a circuit pattern on a wafer is less than or equal to 10 nm, ellipsometry is used along with a dimension measuring scanning electron-beam microscope (SEM) or atomic force microscope (AFM).

Recently, three-dimensional (3D) semiconductor circuit structures have been designed, like fin field-effect transistor (FinFET) structures of logic semiconductor devices and 3D-NAND flash memory of memory semiconductor devices, and these structures have become complicated. Many OCD measuring devices operate based on spectroscopic ellipsometry as the measurement principle. To obtain the dimensions of a semiconductor circuit structure to be measured or optical integers of the material of the object, OCD measuring devices create a model, set a dimension or an optical integer of the object as a floating parameter, and obtain an answer (i.e., the dimension of the semiconductor circuit structure or an optical integer of the material of the semiconductor circuit structure) by fitting the model to measurement results. When the complexity of the structure of an object increases, the number of floating parameters also increases. For example, in OCD measurement of a FinFET, twenty to thirty floating parameters may be required. In ellipsometry, two values of ellipsometric parameters (i.e., $\Psi$ and $\Delta$) are usually obtained as measurement results, however, the ellipsometric parameters (i.e., $\Psi$ and $\Delta$) depend on wavelengths. Accordingly, in the case of spectroscopic ellipsometry, the ellipsometric parameters (i.e., $\Psi$ and $\Delta$) may be written as $\Psi(\lambda)$ and $\Delta(\lambda)$.

To obtain a dimension, at least more ellipsometric parameters (i.e., $\Psi$ and $\Delta$) than the number of floating parameters need to be obtained through measurement for fitting of a model. Accordingly, when the number of floating parameters increases, coupling may occur, in which fitting converges into a different combination of floating parameters than a real dimension. To avoid coupling, it is effective to perform fitting using ellipsometric parameters (i.e., $\Psi$ and $\Delta$) having different dependency than floating parameters. Therefore, ellipsometry measurement is performed under different conditions of an incident angle and an incident azimuth as well as a wavelength, and ellipsometric parameters (i.e., $\Psi$ and $\Delta$) having different dependencies than the floating parameters are used for fitting of a model.

When a Brewster's angle at which the reflectance of p-polarization is 0 is applied to an incident angle in ellipsometry measurement, the sensitivity of the ellipsometry measurement may be maximized. The Brewster's angle ranges from about 65 degrees to about 75 degrees in a semiconductor circuit structure. In such oblique-incidence optical systems, the Scheimpflug principle needs to be satisfied by the width of the visual field. Accordingly, in oblique-incidence optical systems, certain restrictions are required for optical system configurations such as lens design or an angle of incident on a camera. A measurement method called Mueller matrix ellipsometry used for evaluation of an anisotropic material structure is partially used in OCD measurement. Mueller matrix ellipsometry represents the response function of polarization states of reflected light of illumination light with a 4×4 matrix. In Mueller matrix ellipsometry, illumination light in different polarization states are radiated to a semiconductor circuit structure, and the polarization state of reflected light, which results from the illumination light reflected from the semiconductor circuit structure, is measured. Mueller matrix is considered as an effective way of avoiding coupling when the dimensions of a semiconductor circuit structures are measured. However, a measurement time based on the Mueller matrix is several times greater than a usual ellipsometry measurement time.

Despite the demand for precise measurement, ellipsometry measurement based on Mueller matrix ellipsometry or spectroscopic ellipsometry, which is used in an OCD measuring device used in semiconductor manufacturing processes, needs to be performed in a very short time. For example, a measurement time permitted for each wafer is dozens of seconds at most. In such a short time, only a very limited area of a wafer may be measured. Therefore, in semiconductor manufacturing processes, OCD measuring devices are highly expected to precisely and quickly measure ellipsometric parameters (i.e., $\Psi$ and $\Delta$) or a Mueller matrix under many different conditions (e.g., polarization states, incident angles, and incident azimuths).

An ellipsometer used in an OCD measuring device in semiconductor manufacturing processes typically needs one to several seconds to measure a point. This is because a plurality of measurement points are usually needed in a modulation period of a rotating compensator or a phase modulation device included in an ellipsometer. In the case of spectroscopy measurement, it is necessary to measure the amount of light, which is split into different wavelengths by a dispersion element, such as a diffraction grating, at a high signal-to-noise ratio. In the case of Mueller matrix ellipsometry, it is necessary to change illumination light into different polarization states. Accordingly, for total inspection of wafers in manufacturing processes, only several to dozens of points of a wafer are measured, and it may be overlooked that a yield is degraded due to the change in the thickness of a film or in a line width in a wafer.

It is necessary to reduce a measurement time of spectroscopic ellipsometry to increase the number of measurement points in a wafer. To reduce the measurement time, the speed of a driver such as a rotating compensator needs to be increased. However, when the speed of a driver is increased, it is hard to increase the throughput of measurement of ellipsometric parameters (i.e., $\Psi$ and $\Delta$) for OCD measurement or the like because of the instability or heat generation of the driver.

In another approach, use of optical systems satisfying the shine-proof principle is considered. These optical systems permit low position resolution by decreasing a numerical aperture (NA) of an illuminating optical system or a light condensing optical system. Instead, these optical systems increase throughput by simultaneously measuring multiple points in the wide field of view using an image detector. In these optical systems, the frame rate of an image detector or the amount of received light is limited, and accordingly, an image needs to be measured at each of different wavelengths or each of different polarization states of illumination light. Consequently, the effect of increased throughput may be limited.

SUMMARY

The inventive concept provides an ellipsometer and a semiconductor inspection apparatus capable of increasing the throughput of measurement of ellipsometric parameters (i.e., $\Psi$ and $\Delta$).

In typical ellipsometry measurement, it is necessary to obtain the Stokes parameters. Accordingly, it is necessary to measure the intensity of light under different conditions having changing angles of a polarizer or a compensator. Embodiments of the inventive concept are based on a different approach in which a light intensity ratio and a phase difference between two polarization states are obtained by measuring an interference fringe, which is the pattern of lines caused by interference.

According to an aspect of the inventive concept, there is provided an ellipsometer. The ellipsometer includes a lens configured to transmit reflected light generated when illumination light is incident on a measurement surface of a sample, the illumination light being linearly polarized, and the reflected light including a first polarization component being in a first polarization state on the measurement surface and a second polarization component being in a second polarization state on the measurement surface, the second polarization state being different from the first polarization state; a first separation unit configured to separate the reflected light into a first separate reflected light and a second separate reflected light, the first separate reflected light including the first polarization component and the second polarization component, and the second separate reflected light including the first polarization component and the second polarization component; a first polarizing optical element configured to separate the first separate reflected light into a first linearly polarized light that is polarized in a first polarization direction and a second linearly polarized light that is polarized in a second polarization direction that is perpendicular to the first polarization direction; a first interference device configured to form a first interference fringe by allowing components of the first linearly polarized light and the second linearly polarized light with different polarization directions from the first and second polarization directions to interfere with each other; a second separation unit configured to separate the second separate reflected light into a third separate reflected light and a fourth separate reflected light, the third separate reflected light including the first polarization component, and the fourth separate reflected light including the second polarization component; a second polarizing optical element configured to separate the third separate reflected light into a third linearly polarized light that is polarized in a third polarization direction and a fourth linearly polarized light that is polarized in a fourth polarization direction that is perpendicular to the third polarization direction; a second interference device configured to form a second interference fringe by allowing components of the third linearly polarized light and the fourth linearly polarized light that have different polarization directions from the third and fourth polarization directions to interfere with each other; an image detector configured to detect the first interference fringe and the second interference fringe; and an analysis system configured to calculate ellipsometric parameters $\Psi$ and $\Delta$ from the first interference fringe and the second interference fringe.

According to another aspect of the inventive concept, there is provided an ellipsometer. The ellipsometer includes a lens configured to transmit reflected light generated when illumination light is incident on a measurement surface of a sample, the illumination light being linearly polarized; a first separation unit configured to separate the reflected light into a first separate reflected light and a second separate reflected light in a same polarization state; a first polarizing optical element configured to separate the first separate reflected light into a first linearly polarized light that is polarized in a first polarization direction and a second linearly polarized light that is polarized in a second polarization direction that is perpendicular to the first polarization direction; a first interference device configured to form a first interference fringe by allowing components of the first linearly polarized light and the second linearly polarized light that have different polarization directions than the first and second polarization directions to interfere with each other; a second separation unit configured to separate the second separate reflected light into a third separate reflected light and a fourth separate reflected light respectively in orthogonal polarization states; a second polarizing optical element configured to separate the third separate reflected light into a third linearly polarized light that is polarized in a third polarization direction and a fourth linearly polarized light that is polarized in a fourth polarization direction that is perpendicular to the third polarization direction; a second interference device configured to form a second interference fringe by allowing components of the third and fourth linearly polarized lights in different directions than the third and fourth polarization directions to interfere with each other; an image detector configured to detect the first interference fringe and the second interference fringe; and an analysis system configured to calculate ellipsometric parameters $\Psi$ and $\Delta$ from the first interference fringe and the second interference fringe.

According to a further aspect of the inventive concept, there is provided an ellipsometer. The ellipsometer includes a lens configured to transmit a reflected light generated when illumination light with linear polarization is incident on a measurement surface of a sample, the reflected light including a first polarization component in a first direction and a second polarization component in a second direction, the second direction being different from the first direction; a first separation unit configured to separate the reflected light into a first separate reflected light and a second separate reflected light, the first separate reflected light including the first polarization component and the second polarization component, and the second separate reflected light including the first polarization component and the second polarization component; a first mirror configured to reflect the first separate reflected light; a second mirror configured to reflect the second separate reflected light; a wave plate configured to convert the first polarization component of the second separate reflected light that has been reflected from the second mirror into a third polarization component in a third direction that is different from the first and second directions and convert the second polarization component of the second separate reflected light into a fourth polarization component in a fourth direction that is different from the first, second, and third directions; a second separation unit configured to reflect the first polarization component of the first separate reflected light that has been reflected from the first mirror, transmit the second polarization component of the first separate reflected light, and transmit the third and fourth polarization components of the second separate reflected light that has been transmitted by the wave plate; a third separation unit configured to reflect the second polarization component of the first separate reflected light that has been transmitted by the second separation unit and reflect the third and fourth polarization components of the second separate reflected light that has been transmitted by the second separation unit; a first interference device having a first transmission axis and configured to form a first interference fringe by allowing the first polarization component reflected from the second separation unit to interfere with a first transmission axis component of each of the third and fourth polarization components transmitted by the second separation unit; a second interference device having a second transmission axis and configured to form a second interference fringe by allowing second transmission axis components of the second, third and fourth polarization components reflected from the third separation unit to interfere with one another; an image detector configured to detect the first interference fringe and the second interference fringe; and an analysis system configured to calculate ellipsometric parameters $\Psi$ and $\Delta$ from the first interference fringe and the second interference fringe.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
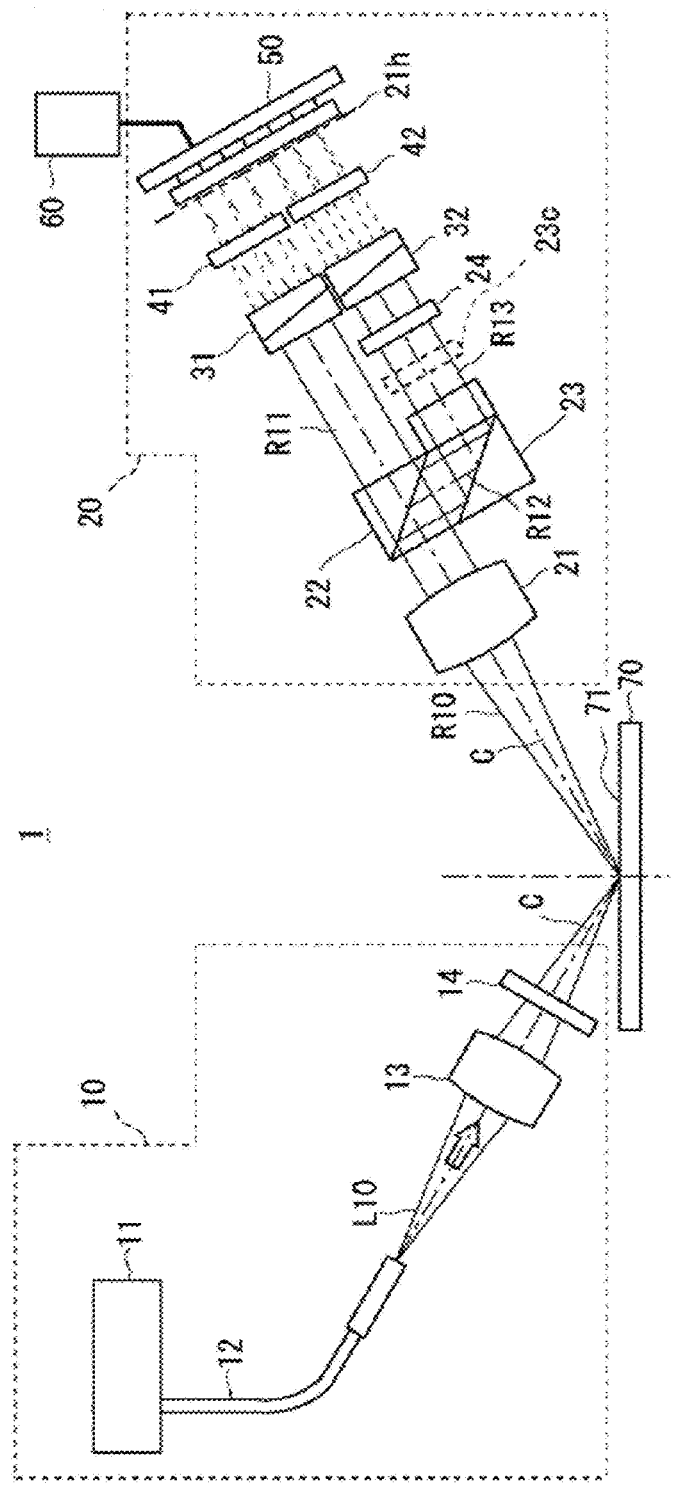
FIG. 1 is a configuration diagram of an ellipsometer according to Embodiment 1.

In the drawings, like reference characters denote like elements, and redundant descriptions thereof will be omitted.

Embodiment 1

Figure 2:
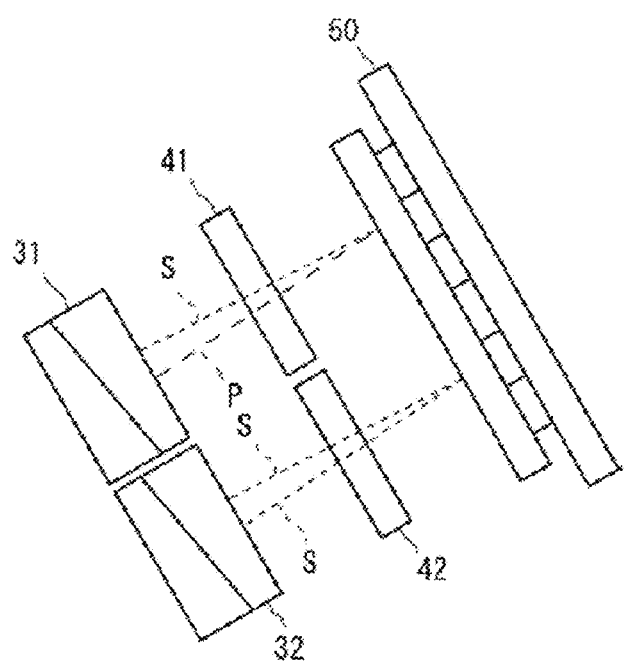
FIG. 2 is a diagram illustrating a polarizing optical element, an interference device, and an image detector in the ellipsometer according to Embodiment 1.
Figure 3:
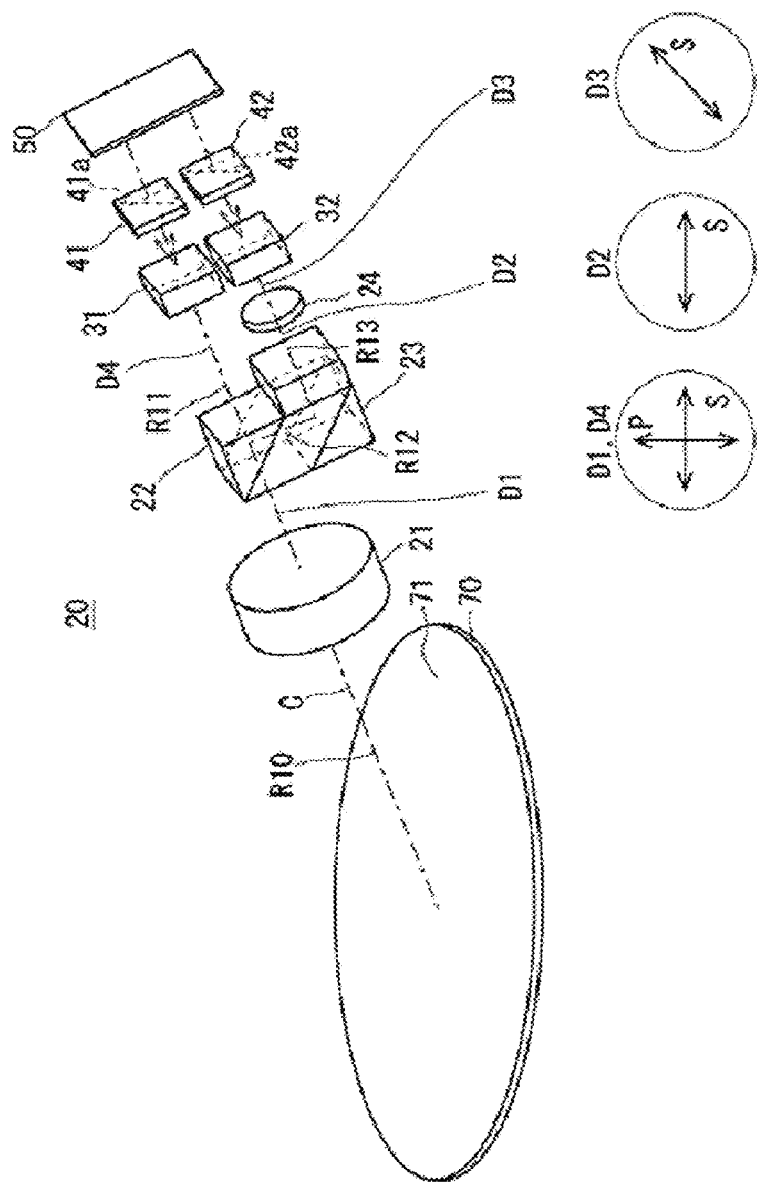
FIG. 3 is a diagram illustrating a light receiving optical system of the ellipsometer according to Embodiment 1.

An ellipsometer according to Embodiment 1 will be described. FIG. 1 is a configuration diagram of an ellipsometer according to Embodiment 1. FIG. 2 is a diagram illustrating a polarizing optical element, an interference device, and an image detector in the ellipsometer, according to Embodiment 1. FIG. 3 is a diagram illustrating a light receiving optical system of the ellipsometer, according to Embodiment 1.

Referring to FIGS. 1 through 3, an ellipsometer 1 may include an illuminating optical system 10, a light receiving optical system 20, and an analysis system 60. The illuminating optical system 10 may include a light source 11, a fiber 12, an illumination lens 13, and a polarizer 14. The light receiving optical system 20l may include a collimating lens 21, a separation unit 22 such as a non-polarizing beam splitter, a separation unit 23 such as a polarizing beam splitter, an λ/4 wave plate 24, polarizing optical elements 31 and 32, interference devices 41 and 42, and an image detector 50.

The ellipsometer 1 may emit illumination light L10 to a measurement surface 71 of a sample 70, receive a reflected light R10 from the measurement surface 71 of the sample 70, and measure ellipsometric parameters (i.e., $\Psi$ and $\Delta$).

The illumination light L10 may be obtained by fully polarizing light in an optical wavelength band, which is generated by the light source 11, and may illuminate the measurement surface 71 of the sample 70. The reflected light R10 from the measurement surface 71 may be split into two reflected lights R11 and R12 by the separation unit 22 such as a non-polarizing beam splitter. The reflected light R11 may include a polarization component which is in p-polarized state on the measurement surface 71 and a polarization component which is in s-polarized state on the measurement surface 71. The polarizing optical element 31 and the interference device 41 may interfere with the reflected light R11 including the p-polarized component on the measurement surface 71 and the s-polarized component on the measurement surface 71.

By the separation unit 23, a reflected light R13 may include only a component of the reflected light R12 which is in s-polarization state on the measurement surface 71 and may not include a component of the reflected light R12 which is in p-polarization state on the measurement surface 71 from a reflected light R12. Accordingly, the separation unit 23 may allow s-polarization components of the reflected light R12 to interfere with each other on the image detector 50. As described above, the ellipsometer 1 may be configured to form two interference fringes (i.e., an interference fringe by the reflected light R11 and an interference fringe by the reflected light R12) on the image detector 50. The analysis system 60 may process an image of the two interference fringes.

The illuminating optical system 10 may illuminate the measurement surface 71 of the sample 70 with the illumination light L10 with linear polarization. An optical axis C of the illumination light L10 incident to the measurement surface 71 is oblique to the measurement surface 71. At this time, the illumination light L10 with linear polarization is not limited to the case where the illumination light L10 is configured only with linear polarization but comprehensively refers to the cases where the illumination light L10 further includes other polarization components unless noticeably compromising the precision of measurement, which will be described below. Similarly, "with first polarization", "with second polarization", "with p-polarization", and "with s-polarization" may refer to further including other polarization components unless noticeably compromising the precision of measurement.

The light source 11 may generate the illumination light L10. For example, the light source 11 may generate the illumination light L10 in a wideband wavelength range. For example, the illumination light L10 generated by the light source 11 may include white light. However, embodiments are not limited thereto. The illumination light L10 generated by the light source 11 may include a wideband wavelength. The illumination light L10 generated by the light source 11 may be incident to the fiber 12.

The fiber 12 may be a cable-type light guide having an end and an opposite end. The illumination light L10 incident to the end of the fiber 12 may be output from the opposite end of the fiber 12. The illumination light L10 output from the opposite end of the fiber 12 may be incident to the illumination lens 13.

For example, the illumination lens 13 may include a convex lens. The illumination lens 13 may change the distribution of angles of the illumination light L10 incident thereto. The illumination lens 13 may illuminate the measurement surface 71 with the illumination light L10 with linear polarization. For example, the illumination lens 13 may illuminate the measurement surface 71 by focusing the illumination light L10, which is output from the opposite end of the fiber 12, to a point. The polarizer 14 may be between the illumination lens 13 and the sample 70. Accordingly, the illumination lens 13 may radiate the illumination light L10 to the polarizer 14 such that the illumination light L10 passes through the polarizer 14 and is focused (for example, as a point) to the measurement surface 71.

For example, the polarizer 14 may include a polarizing plate. The illumination light L10 that has passed through the polarizer 14 may include only a linearly polarization component in one direction. The illumination light L10 that has passed through the polarizer 14 may be fully polarized.

For example, the polarizer 14 may emit, to the sample 70, the illumination light L10 with linear polarization at an angle of 45° to the ground (i.e., the sample surface). In the ellipsometer 1 of the present embodiment, the optical axis C of the illumination light L10 incident to the measurement surface 71 of the sample 70 and the optical axis C of the reflected light R10 from the measurement surface 71 may be oblique to the measurement surface 71 of the sample 70, as illustrated.

The collimating lens 21 may transmit the reflected light R10, which is generated when the illumination light L10 with linear polarization is reflected from the measurement surface 71 of the sample 70. The collimating lens 21 may allow the reflected light R10 to be incident to the separation unit 22. The collimating lens 21 may transmit the reflected light R10 such that the reflected light R10 is incident to the separation unit 22. For example, the separation unit 22 may include a non-polarizing beam splitter. The separation unit 22 may include a non-polarizing beam splitter film but is not limited thereto. The separation unit 22 may include a half mirror.

The illumination light L10 illuminating the measurement surface 71 of the sample 70 may be formed with linear polarization in one direction.

For example, the illumination light L10 with linear polarization in one direction may be focused to a point when incident to the measurement surface 71 of the sample 70. Accordingly, when the illumination light L10 is fully and linearly polarized and has the optical axis C oblique to the measurement surface 71, the illumination light L10 may include a p-polarization component and an s-polarization component according to the incident azimuth thereof to the measurement surface 71. The s-polarization component of the illumination light L10 may be reflected and become an s-polarization component of the reflected light R10. The p-polarization component of the illumination light L10 may be reflected and become a p-polarization component of the reflected light R10. Accordingly, the reflected light R10 from the measurement surface 71 of the sample 70 may include a polarization component which is p-polarization component on the measurement surface 71 and a polarization component which is an s-polarization component on the measurement surface 71.

The collimating lens 21 may transmit the reflected light R10, which is generated when the illumination light L10 with linear polarization is reflected from the measurement surface 71 of the sample 70. At this time, the reflected light R10 may include a first polarization component in a first direction and a second polarization component in a second direction on the measurement surface 71, wherein the second direction is different from the first direction. For example, the first polarization component may be in s-polarization state on the measurement surface 71, and the second polarization component may be in p-polarization state on the measurement surface 71. Accordingly, the reflected light R10 passing through the collimating lens 21 may include a polarization component which is in p-polarization state on the measurement surface 71 and a polarization component which is in s-polarized state on the measurement surface 71 at a position D1 in FIG. 3.

The separation unit 22 such as a non-polarizing beam splitter may split the reflected light R10 into the reflected light R11 and the reflected light R12. Hereinafter, the reflected light R11 may be referred to as a first separate reflected light, and the reflected light R12 may be referred to as a second separate reflected light. For example, the separation unit 22 may partially transmit and partially reflect the reflected light R10 incident thereto. The reflected light R10 that has passed through the separation unit 22 is referred to as the reflected light R11, and the reflected light R10 that has been reflected from the separation unit 22 is referred to as the reflected light R12.

The reflected light R11 may include a polarization component which is in p-polarization state on the measurement surface 71 and a polarization component which is in s-polarization state on the measurement surface 71 at a position D4 in FIG. 3. The reflected light R12 may also include a polarization component which is in p-polarization state on the measurement surface 71 and a polarization component which is in s-polarization state on the measurement surface 71.

The reflected light R12 reflected from the separation unit 22 may be incident to the separation unit 23 such as a polarizing beam splitter. For example, the separation unit 23 may include a polarizing beam splitter including a polarizing beam splitter film.

The separation unit 23 may separate the reflected light R12 into an s-polarized reflected light R13 and a p-polarized reflected light (not shown). The separation unit 23 may reflect s-polarization and transmit p-polarization. For example, the separation unit 23 may reflect the reflected light R13 having an s-polarized component of the reflected light R12 and transmit reflected light having a p-polarized component of the reflected light R12. The reflected light R12 may include a p-polarization component on the measurement surface 71 and an s-polarization component on the measurement surface 71. The reflected light R13 from the separation unit 23 may include a polarization component which is in s-polarization state on the measurement surface 71 at a position D2 in FIG. 3. The reflected light R12 from the separation unit 23 may be incident to the λ/4 wave plate 24.

When the extinction ratio of the polarizing beam splitter film of the separation unit 23 is not sufficient, a polarizing plate 23c may be provided between the separation unit 23 and the λ/4 wave plate 24. Alternatively, the separation unit 23 may include a mirror and the polarizing plate 23c instead of the polarizing beam splitter. For example, the reflected light R12 from the separation unit 22 may be reflected from the mirror, which is provided instead of the polarizing beam splitter, and then incident to the polarizing plate 23c. The polarizing plate 23c may block the p-polarization component of the reflected light R12 from the mirror and transmit the reflected light R13 with s-polarization.

The λ/4 wave plate 24 may change the s-polarization component of the reflected light R13 into polarization component polarized in a direction different from the s-polarization direction and the p-polarization direction. For example, the λ/4 wave plate 24 may rotate a linear polarization direction of s-polarization 45 degrees around the polarization axis of the reflected light R13. The reflected light R13 may include light, which is polarized in a different direction than the reflected light R12, at a position D3 in FIG. 3. The reflected light R13 may include a polarization component, which is an s-polarized component on the measurement surface 71, different from a polarization component of the reflected light R12.

The reflected light R11 that has passed through the separation unit 22 may be incident to the polarizing optical element 31. The reflected light R13 that has passed through the λ/4 wave plate 24 may be incident to the polarizing optical element 32. Each of the polarizing optical elements 31 and 32 may include, for example, a Nomarski prism. However, the polarizing optical elements 31 and 32 are not limited to a Nomarski prism and may include a Wollaston prism or a Rochon prism.

The polarizing optical element 31 may separate the reflected light R11 into two linearly polarized light beams respectively having polarization directions orthogonal to each other. The polarization directions orthogonal to each other are respectively defined as an X direction and a Y direction. A plane defined by the X direction and the Y direction is orthogonal to the optical axis C of the reflected light R11. The polarizing optical element 31 may separate incident light into a linearly polarized component in the X direction and a linearly polarized component in the Y direction. For example, the polarizing optical element 31 may separate the reflected light R11, which includes a polarization component which is in p-polarization state on the measurement surface 71 and a polarization component which is in s-polarization component on the measurement surface 71, into a p-polarization component and an s-polarization component.

The polarizing optical element 31 may steer a component of the reflected light R11, which is linearly polarized in the X direction, and a component of the reflected light R11, which is linearly polarized in the Y direction, such that the component of the reflected light R11 linearly polarized in the X direction and the component of the reflected light R11 linearly polarized in the Y direction meet each other at one point on the image detector 50. The reflected light R11 output from the polarizing optical element 31 may pass through the interference device 41 and then be incident to the image detector 50.

The polarizing optical element 32 may separate the reflected light R13 into two linearly polarized light beams respectively having polarization directions orthogonal to each other. The polarization directions orthogonal to each other are respectively defined as the X direction and the Y direction. The plane defined by the X direction and the Y direction is orthogonal to the optical axis C of the reflected light R13. The polarizing optical element 32 may separate light passing through the polarizing optical element 32 into a linearly polarization component in the X direction and a linearly polarization component in the Y direction. For example, the polarizing optical element 32 may separate the reflected light R13, which includes linearly polarized light rotated 45 degrees by the λ/4 wave plate 24 from a light which include only a polarization component which is in s-polarization state on the measurement surface 71, into the linearly polarization component in the X direction and the linearly polarization component in the Y direction. Accordingly, the polarizing optical element 32 may separate the polarization component which is in s-polarization state on the measurement surface 71 into light beams having the same intensity.

The polarizing optical element 32 may steer a component of the reflected light R13, which is linearly polarized in the X direction, and a component of the reflected light R13, which is linearly polarized in the Y direction, such that the component of the reflected light R13 linearly polarized in the X direction and the component of the reflected light R13 linearly polarized in the Y direction meet each other at one point on the image detector 50. The reflected light R13 output from the polarizing optical element 32 may pass through the interference device 42 and then be incident to the image detector 50.

Figure 4:
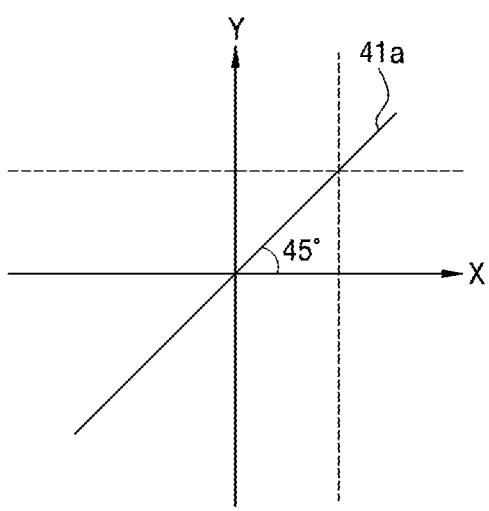
FIG. 4 is a diagram illustrating linear polarization passing through the interference device of the ellipsometer according to Embodiment 1.

FIG. 4 is a diagram illustrating linear polarization passing through the interference device of the ellipsometer 1, according to Embodiment 1. Referring to FIG. 4, the interference device 41 such as a polarizing plate may transmit a linearly polarized component in a direction at a certain angle to each of the X and Y directions, in which the polarizing optical element 31 separates incident light. Hereinafter, an axis of the direction at a certain angle to each of the X and Y directions is referred to as a transmission axis 41a. For example, the transmission axis 41a may correspond to a 45-degree direction. In this case, the interference device 41 may transmit a linearly polarized component in a direction at an angle of 45 degrees to each of the X and Y directions, in which the polarizing optical element 31 separates incident light.

Accordingly, the interference device 41 may transmit a polarization component, which is at an angle of 45 degrees to the X direction, among the linearly polarized component in the X direction. The interference device 41 may also transmit a polarization component, which is at an angle of 45 degrees to the Y direction, among the linearly polarized component along the Y direction. Accordingly, when two linearly polarized components orthogonal to each other pass through the interference device 41, linearly polarized light of a polarization component in the direction of the transmission axis 41a may be output. Accordingly, two linearly polarized lights polarized in an orthogonal direction to each other are coherent to each other.

As described above, the interference device 41 may include a polarizing plate, which transmits each of two linearly polarized components in a direction different from the polarization direction thereof. Accordingly, the interference device 41 may form an interference fringe (i.e., a first interference fringe) generated by interference between components in directions different from the polarization directions of the two linearly polarized components that have passed through the polarizing optical element 31.

The reflected light R11 output from the interference device 41 may be incident to the image detector 50.

The interference device 42 may transmit a component of the reflected light R13, which is parallel to a transmission axis 42a that is at a certain angle to each of the X and Y directions, in which the polarizing optical element 32 separates incident light. For example, the interference device 42 may transmit linearly polarized components of the reflected light R13 in a direction at an angle of 45 degrees to each of the X and Y directions, in which the polarizing optical element 32 separates incident light.

Accordingly, the interference device 42 may transmit a polarization component, which is at an angle of 45 degrees to the X direction, among linearly polarized components in the X direction. The interference device 42 may also transmit a polarization component, which is at an angle of 45 degrees to the Y direction, among linearly polarized components in the Y direction. Accordingly, when two linearly polarized components orthogonal to each other pass through the interference device 42, linearly polarized light of a polarized component in the direction parallel to the transmission axis 42a may be output. Accordingly, two linearly polarization components having orthogonal polarization directions to each other are coherent to each other.

As described above, the interference device 42 may include a polarizing plate, which transmits each of two linearly polarized components in a direction different from the polarization direction thereof. Accordingly, the interference device 42 may form an interference fringe (i.e., a second interference fringe) generated by interference between polarization components in polarization directions different from the polarization directions of the two linearly polarized components that have passed through the polarizing optical element 32.

The reflected light R13 output from the interference device 42 may be incident to the image detector 50.

The image detector 50 may receive the reflected light R11 and the reflected light R13. The image detector 50 may be located at the pupil position of the collimating lens 21 and a conjugate pupil position 21h. The reflected light R11 may include polarized components in the same direction (e.g., the direction of the transmission axis 41a), which originate in two linearly polarization components orthogonal to each other. Accordingly, a plurality of light beams of the reflected light R11 may interfere with each other on the image detector 50. The reflected light R13 may also include polarization components in the same direction (e.g., the direction of the transmission axis 42a), which originate in two linearly polarized components orthogonal to each other. Accordingly, a plurality of light beams of the reflected light R13 may interfere with each other on the image detector 50.

Figure 5:
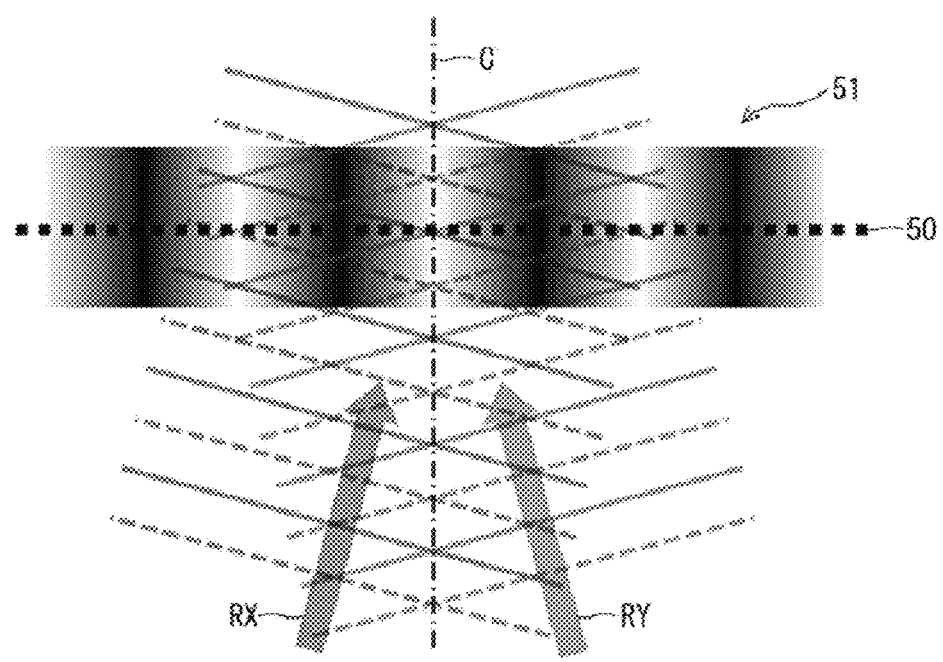
FIG. 5 is a diagram illustrating a wavefront of linear polarization included in reflected light incident to the image detector of the ellipsometer according to Embodiment 1.
Figure 6:
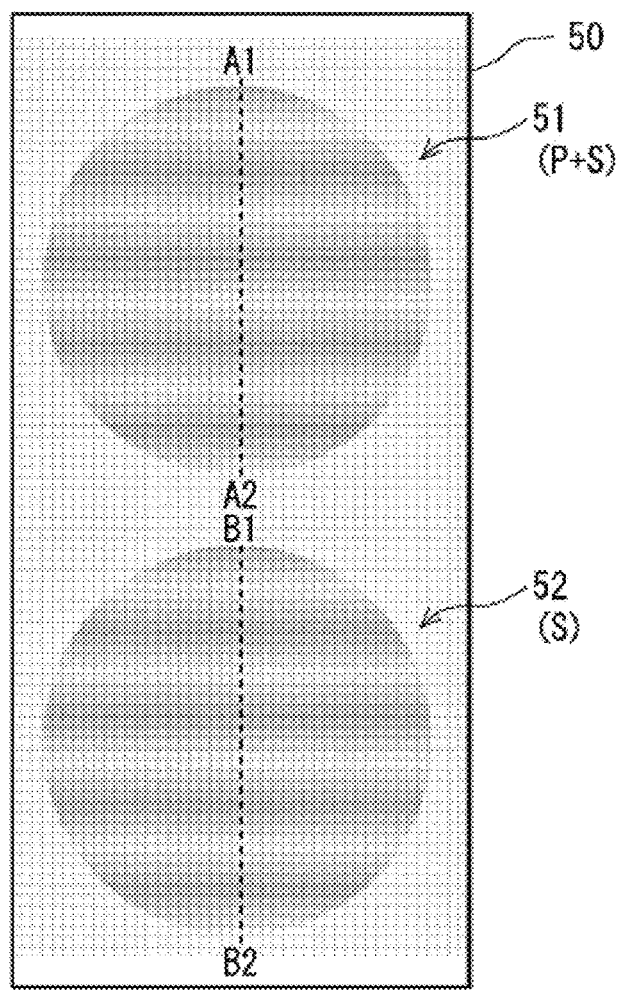
FIG. 6 is a diagram illustrating interference fringes of reflected lights having interference occurring in the image detector of the ellipsometer according to Embodiment 1.

FIG. 5 is a diagram illustrating a wavefront of linear polarization included in the reflected light R11 incident to the image detector 50 of the ellipsometer, according to Embodiment 1. FIG. 6 is a diagram illustrating interference fringes of reflected lights R11 and R13 having interference occurring in the image detector 50 of the ellipsometer, according to Embodiment 1. As shown in FIG. 5, the reflected light R11 with two linearly polarized light beams RX and RY resulting from separation by the polarizing optical element 31 may pass through the interference device 41 and form an interference fringe 51 on the image detector 50. As shown in the upper part of FIG. 6, the image detector 50 may detect the interference fringe 51, which is formed by polarization components of the reflected light R11 passing through the interference device 41. The interference fringe 51 is formed by the reflected light R11 including a polarization component which is in p-polarization state on the measurement surface 71 and a polarization component which is in s-polarization state on the measurement surface 71.

The image detector 50 may receive the reflected light R13. The reflected light R13 includes polarization components in the same direction, which originate in two linearly polarized light beams orthogonal to each other. Accordingly, the reflected light R13 may have interference occurring on the image detector 50. As shown in the lower part of FIG. 6, the image detector 50 may detect an interference fringe 52 of polarization components of the reflected light R13 passing through the interference device 42. The interference fringe 52 is formed by the reflected light R13 originating from polarization component which is in an s-polarization state on the measurement surface 71.

As described above, in the ellipsometer 1, the reflected light R10 from the measurement surface 71 is converted into parallel light by the collimating lens 21 of the light receiving optical system 20 and then separated into two light beams by the separation unit 22 such as a non-polarizing beam splitter. The reflected light R11 passing through the position D4 may be incident to the polarizing optical element 31 such as a Nomarski prism and undergo angular separation in the entry surface of the polarizing optical element 31, thereby generating a light beam including a p-polarization component and a light beam including an s-polarization component. At this time, the angular separation means that two separate light beams respectively travel in directions oblique to each other. Two light beams resulting from the angular separation of the reflected light R11 are coherent to each other when passing through the interference device 41, such as an analyzer, which has the transmission axis 41a forming 45 degrees with the polarization direction of each of the two light beams.

The reflected light R13 passing through the positions D2 and D3 at one side may be filtered by the separation unit 23, such as a polarizing beam splitter, and thus include only a polarization component which is in s-polarized state on the measurement surface 71. The polarization direction of the reflected light R13 may also be rotated 45 degrees by the λ/4 wave plate 24. Accordingly, the reflected light R13 may be angularly separated from the s-polarization component by the polarizing optical element 32, such as a Nomarski prism, at the same intensity. Two light beams angularly separated from the reflected light R13 are coherent to each other when passing through the interference device 42, such as an analyzer, which has the transmission axis 42a forming 45 degrees with the polarization direction of each of the two light beams. Consequently, the ellipsometer 1 may form two interference fringes 51 and 52 on the image detector 50.

For example, the analysis system 60 may include an information processing unit such as a personal computer (PC) or a server. The analysis system 60 may calculate ellipsometric parameters (i.e., Ψ and Δ) from the interference fringes 51 and 52 detected by the image detector 50. In detail, the analysis system 60 may obtain an amplitude and a phase from the interference fringes 51 and 52 using a Fourier transform. The phase corresponds to ellipsometry Δ. Information $|E_P|/|E_S|$ corresponding to Ψ ellipsometry is obtained by dividing an amplitude $\Psi_1$, which is obtained from the interference fringe 51 of p-polarization and s-polarization, by an amplitude $\Psi_2$, which is obtained from the interference fringe 52 of s-polarization. Accordingly, three kinds of information, i.e., the ellipsometric parameters Ψ and Δ and the total amount of light, may be obtained.

Figure 7:
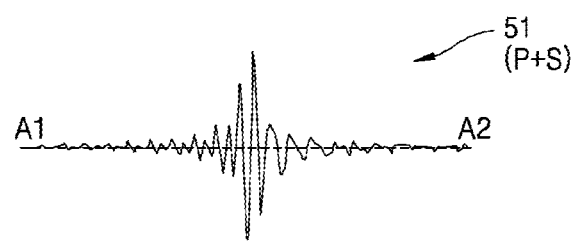
FIG. 7 illustrates graphs of the intensities of interference fringes detected by the image detector of the ellipsometer according to Embodiment 1.
Figure 7:
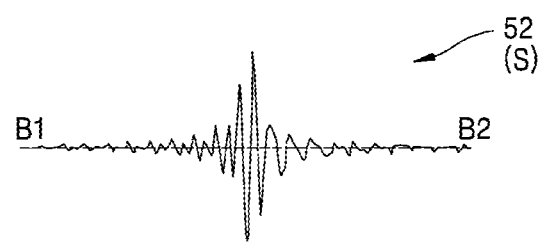

FIG. 7 illustrates graphs of the intensities of the interference fringes 51 and 52 detected by the image detector 50 of the ellipsometer, according to Embodiment 1. In FIG. 7, the horizontal axis is a position of each of the interference fringes 51 and 52 and the vertical axis is an amplitude distribution.

Figure 8:
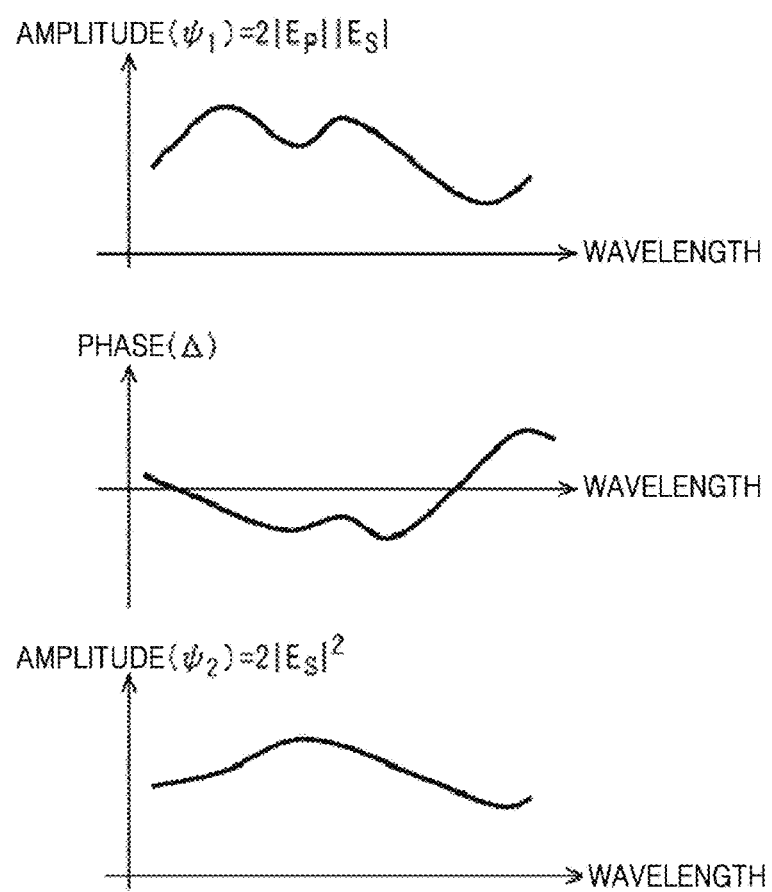
FIG. 8 illustrates graphs to describe the analysis of the interference fringes detected by the image detector of the ellipsometer according to Embodiment 1.

FIG. 8 illustrates graphs to describe the analysis of the interference fringes 51 and 52 of the reflected lights R11 and R13 having interference occurring on the image detector 50 of the ellipsometer, according to Embodiment 1. In detail, FIG. 8 illustrates the correlation between the wavelength of the illumination light L10 and the real part and imaginary part of the intensity distribution of each of the interference fringes 51 and 52, which has undergone a Fourier transform. At this time, the real part of the intensity distribution of each of the interference fringes 51 and 52, which has undergone a Fourier transform, may indicate an amplitude, and the imaginary part thereof may indicate a phase.

As shown in FIGS. 7 and 8, an intensity distribution $I_{fringe1}$ of the reflected light R11 in the interference fringe 51 may be fitted according to Equation 1 below. An intensity distribution $I_{fringe2}$ of the reflected light R13 in the interference fringe 52 may be fitted according to Equation 2 below.

[Equation 1]
$$I_{fringe1} = |E_P|^2 + |E_S|^2 + 2|E_P||E_S|\exp\{i(\delta_P - \delta_S)\} \quad (1)$$
$$= |E_P|^2 + |E_S|^2 + 2|E_P||E_S|\exp(i\Delta)$$

[Equation 2]
$$I_{fringe2} = 2|E_S|^2 + 2|E_S|^2\exp\{i(\delta_P - \delta_S)\} \quad (2)$$
$$= 2|E_S|^2 + 2|E_S|^2\exp(i\Delta)$$

Terms (i.e., $2|E_P| |E_S|\exp(i\Delta)$ in Equation 1 and $2|E_S|^2\exp(i\Delta)$ in Equation 2) including exp correspond to alternating current (AC) components. Accordingly, the amplitude $\Psi_1$ ($=2|E_P| |E_S|$) and the phase Δ may be obtained by performing a Fourier transform on the intensity distribution $I_{fringe1}$ during fitting. In addition, the amplitude $\Psi_2$ ($=2|E_S|^2$) and the phase Δ may be obtained by performing a Fourier transform on the intensity distribution $I_{fringe2}$.

The phase Δ corresponds to ellipsometry Δ. The amplitude Ψ may be calculated by dividing the amplitude $\Psi_1$, which is obtained from the interference fringe 51 of the reflected light R11 with p-polarization and s-polarization, by the amplitude $\Psi_2$ obtained from the interference fringe 51 of the reflected light R13 with s-polarization. In other words, $|E_P|/|E_S|$ corresponding to ellipsometry Ψ may be calculated from an amplitude $\Psi_1/\Psi_2=\tan^{-1}\Psi$. As described above, the analysis system 60 may perform a Fourier transform on the interference fringes 51 and 52 and calculate the ellipsometric parameters Ψ and Δ from the interference fringes 51 and 52 that have undergone a Fourier transform. In addition, the analysis system 60 may obtain information about the total amount of light.

In the present embodiment, the ellipsometer 1 may use the polarizing optical elements 31 and 32 to measure the ellipsometric parameters Ψ and Δ. The polarizing optical elements 31 and 32 may respectively separate the reflected light R11 and the reflected light R13, which are from the measurement surface 71 of the sample 70, into the two linearly polarized light beams RX and RY respectively in polarization directions orthogonal to each other and may respectively form the interference fringes 51 and 52 on the image detector 50 from the two linearly polarized light beams RX and RY (FIG. 5). Two independent parameters, i.e., the ellipsometric parameters Ψ and Δ, may be directly measured from the result of measuring the contrast and phase of the interference fringes 51 and 52. Consequently, it is not necessary to measure the amounts of light of at least four polarization components in time series using a rotating polarizer or a compensator to measure the ellipsometric parameters Ψ and Δ.

According to the related art, Stokes parameters are obtained from the amounts of light in different polarization states, and the ellipsometric parameters Ψ and Δ are obtained from the Stokes parameters. In the present embodiment, the ellipsometric parameters Ψ and Δ may be directly obtained from a single image. Accordingly, measurement may be performed in a short time, and throughput of optical critical dimension (OCD) measurement may be increased.

In addition, as compared to ellipsometers according to the related art, there is no moving element, and accordingly, the ellipsometric parameters Ψ and Δ may be reliably measured.

Due to the λ/4 wave plate 24 rotating the reflected light R13 around a polarization axis, the polarizing optical elements 31 and 32, such as Nomarski prisms, may have the same separating directions as each other, thereby facilitating the design of an optical device. In addition, when the polarizing optical elements 31 and 32 have the same separating directions as each other, the polarizing optical elements 31 and 32 and the interference devices 41 and 42 may be integrally formed with one another.

In an ellipsometer used in an OCD measuring device according to the related art, an incident angle of illumination light to a measurement surface of a sample is fixed to a Brewster angle. However, in the present embodiment, the image detector 50 is located at the pupil position or conjugate pupil position 21h of a collimating lens 21 having a large numerical aperture (NA) such that the ellipsometric parameters Ψ and Δ may be measured at a random incident angle and a random incident azimuth. Such configuration may not be easily realized in ellipsometers rotating an analyzer according to the related art.

According to example embodiments, the ellipsometer 1 may use measurement results, which are obtained under many different conditions, during fitting of a microstructure model on a wafer. Because the measurement results, which are obtained under many different conditions, may alleviate or prevent coupling of different dimensions, which is a main problem in an OCD measuring device, the ellipsometer 1 according to example embodiments may particularly increase precision of measurement of three-dimensional (3D) semiconductor structures. In addition, the illuminated area of the sample 70 by the illumination light L10 may be reduced from φ30 μm to (φ1 μm, and the distribution of dimensions in a chip may be evaluated with high position resolution. Semiconductor manufacturing process may be appropriately controlled by reflecting these measurement results in lithography, film forming, or an etching process. Accordingly, the yield and productivity of semiconductor manufacturing may be increased.

In addition, the dimensions of a test pattern, which is arranged in a semiconductor chip to measure the ellipsometric parameters Ψ and Δ, may be reduced from dozens of μm to several μm in a logic. Therefore, an available area for circuits of a semiconductor chip may be increased, which may contribute to the reduction of the cost of semiconductor devices.

Embodiment 2

Figure 9:
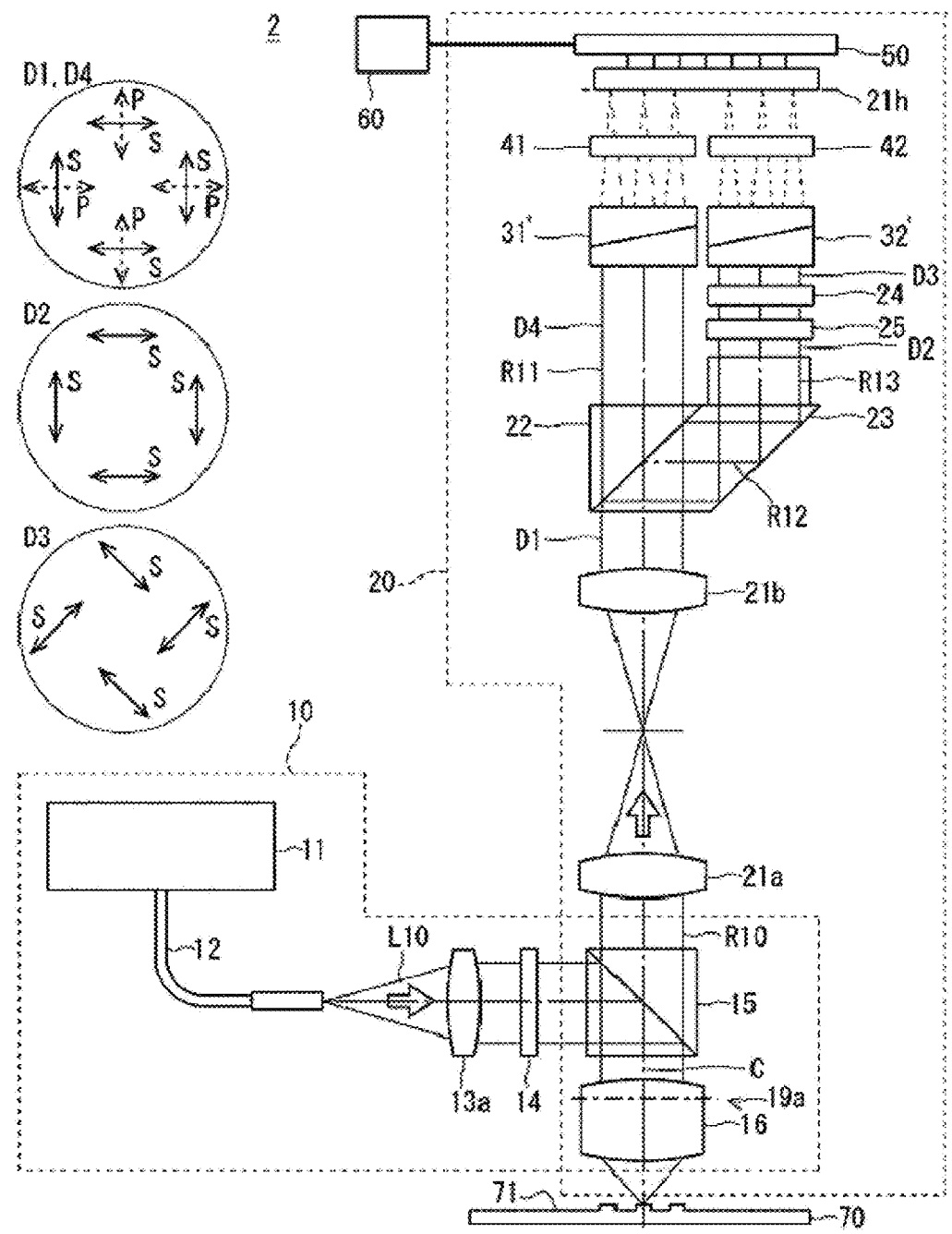
FIG. 9 is a configuration diagram of an ellipsometer according to Embodiment 2.

In an ellipsometer 2 of the present embodiment, the reflected light R10 may be vertically incident to the measurement surface 71 of the sample 70. FIG. 9 is a configuration diagram of the ellipsometer 2 according to Embodiment 2. As shown in FIG. 9, the ellipsometer 2 may include the illuminating optical system 10, the light receiving optical system 20, and the analysis system 60, like Embodiment 1.

FIG. 9 shows a p-polarization component and an s-polarization component as some components of reflected light at the positions D1 through D4.

The illuminating optical system 10 may include the light source 11, the fiber 12, an illumination lens 13a, the polarizer 14, a beam splitter 15, and an objective lens 16. The light source 11 and the fiber 12 are the same as those of Embodiment 1. The light receiving optical system 20 may include the objective lens 16, the beam splitter 15, relay lenses 21a and 21b, the separation unit 22 such as a non-polarizing beam splitter, the separation unit 23 such as a polarizing beam splitter, an azimuth polarizer 25, the λ/4 wave plate 24, polarizing optical elements 31' and 32', the interference devices 41 and 42, and the image detector 50. The objective lens 16 and the beam splitter 15 may be elements of both the illuminating optical system 10 and the light receiving optical system 20.

The illumination light L10 may include the same optical path as the reflected light R10 due to the beam splitter 15 and may illuminate the measurement surface 71 of the sample 70 through the objective lens 16. In the present embodiment, the ellipsometer 2 may include the objective lens 16 having a large NA, the relay lenses 21a and 21b at the pupil position of the objective lens 16, and the image detector 50 at the conjugate pupil position 21h and thus simultaneously measure a plurality of incident angles and incident azimuths. These characteristics give advantages to semiconductor inspection devices, and more particularly, OCD measuring devices, which need to perform measurement under different conditions to prevent coupling.

The illumination lens 13a may include, for example, a convex lens. The illumination lens 13a may change the angle distribution of the illumination light L10 when emitting the illumination light L10 to the polarizer 14. For example, the illumination lens 13a may convert the illumination light L10 output from the opposite end of the fiber 12 into parallel light. The illumination light L10 may be incident, as parallel light, to the polarizer 14.

The illumination light L10 generated by the light source 11 may be incident to the polarizer 14. The polarizer 14 may linearly polarize the illumination light L10. For example, the polarizer 14 may output the illumination light L10, which has been linearly polarized in a polarization direction at an angle of 45 degrees to the ground, to the beam splitter 15.

The beam splitter 15 may reflect a portion of the illumination light L10 and transmit a portion of the illumination light L10.

The beam splitter 15 may reflect a portion of the illumination light L10 to the objective lens 16. The illumination light L10 reflected from the beam splitter 15 may be incident to the objective lens 16.

The objective lens 16 may illuminate the measurement surface 71 of the sample 70 with the illumination light L10 with linear polarization. The objective lens 16 may illuminate the measurement surface 71 of the sample 70 by focusing the illumination light L10, which is reflected from the beam splitter 15, to a point. The objective lens 16 may transmit the reflected light R10, which results from reflection of the illumination light L10 from the measurement surface 71 of the sample 70. In the ellipsometer 2 of the present embodiment, the optical axis C of the illumination light L10 incident to the measurement surface 71 and the optical axis C of the reflected light R10 from the measurement surface 71 may be orthogonal to the measurement surface 71.

The illumination light L10 illuminating the measurement surface 71 may include a linearly polarized component in one direction. The illumination light L10 including the linearly polarized component in one direction may be focused on the measurement surface 71 of the sample 70. Accordingly, when the illumination light L10 is fully and linearly polarized and has the optical axis C orthogonal to the measurement surface 71, the illumination light L10 may include a p-polarization component and an s-polarization component according to an incident azimuth with respect to the measurement surface 71. In detail, the s-polarization component of the illumination light L10 may be reflected as an s-polarization component from the measurement surface 71, and the p-polarization component of the illumination light L10 may be reflected as a p-polarization component from the measurement surface 71.

The objective lens 16 may transmit the reflected light R10, which results from the illumination light L10 reflected from the measurement surface 71, to the beam splitter 15. The beam splitter 15 may transmit a portion of the reflected light R10. For example, the reflected light R10 transmitted by the beam splitter 15 may be incident to the relay lens 21a.

The relay lens 21a may focus the reflected light R10 transmitted by the beam splitter 15 to form an image and then allow the reflected light R10 to be incident to the relay lens 21b. The relay lens 21b may convert the reflected light R10 into parallel light. The reflected light R10 transmitted by the relay lens 21b may include a p-polarization component on the measurement surface 71 and an s-polarization component on the measurement surface 71 at a position D1 in FIG. 9. The position D1 refers to a portion of the cross-section of the reflected light R10. The relay lens 21b may transmit the reflected light R10 to the separation unit 22 such as a non-polarizing beam splitter.

Like Embodiment 1, the separation unit 22 such as a non-polarizing beam splitter may separate the reflected light R10 into the reflected light R11 and the reflected light R12. For example, the separation unit 22 may transmit, as the reflected light R11, a portion of the reflected light R10 from the measurement surface 71 of the sample 70 and reflect, as the reflected light R12, another portion of the reflected light R10.

The reflected light R11 transmitted by the separation unit 22 may include a polarization component which is in p-polarization state on the measurement surface 71 and a polarization component which is in s-polarization state on the measurement surface 71 at the position D4 in FIG. 9. The position D4 refers to a portion of the cross-section of the reflected light R11. The reflected light R11 transmitted by the separation unit 22 may be incident to the polarizing optical element 31'. For example, the polarizing optical element 31' may include a Nomarski prism.

A normal incident optical system according to the present embodiment may have an incident azimuth of 360 degrees. However, because a p-polarization direction and an s-polarization direction change according to incident azimuth, the direction of angular separation needs to be changed at each incident azimuth for efficient measurement.

Figure 10:
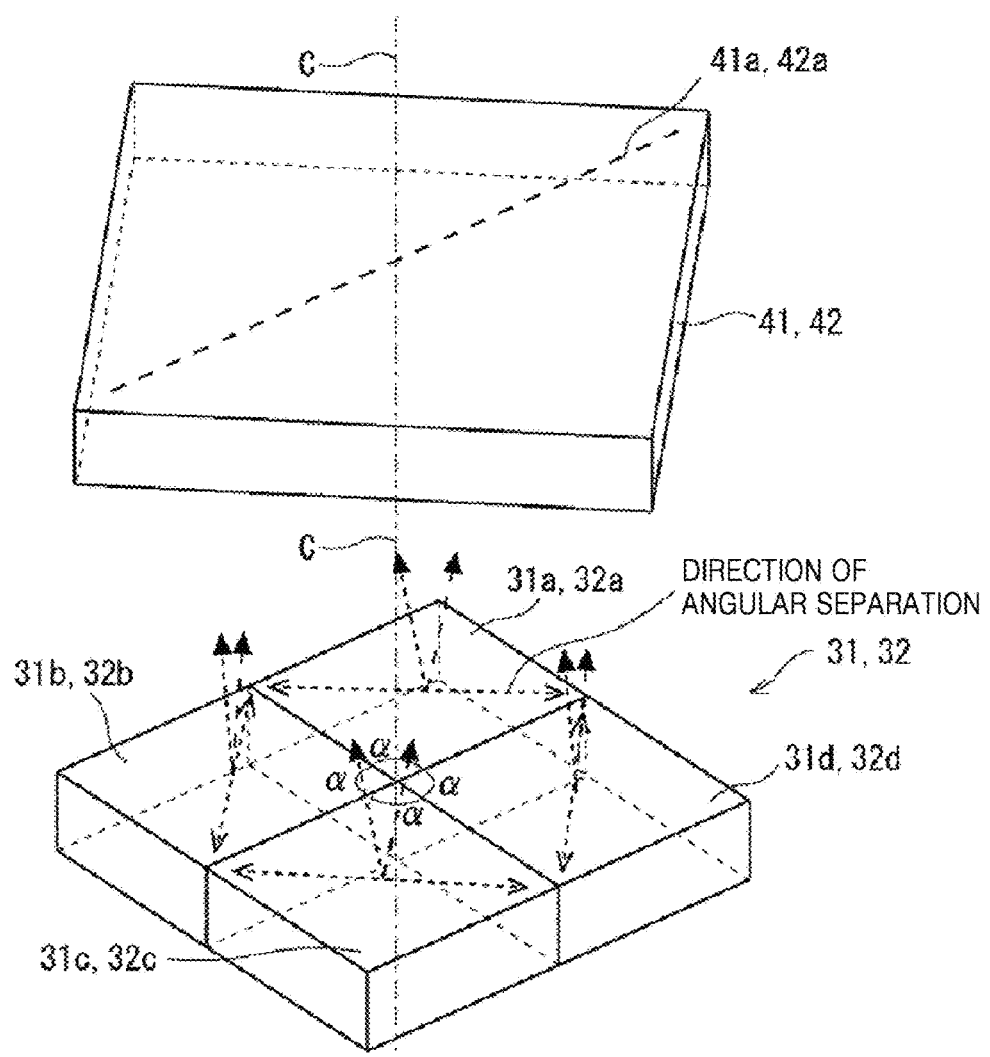
FIG. 10 is a diagram illustrating a polarizing optical element and an interference device in the ellipsometer according to Embodiment 2.

FIG. 10 is a diagram illustrating a polarizing optical element and an interference device in the ellipsometer, according to Embodiment 2. As shown in FIG. 10, the polarizing optical elements 31' and 32' may have a structure in which a Nomarski prism is divided into four quadrants and the direction of angular separation of polarization of each quadrant is a circumferential direction. The direction of the transmission axis 41a or 42a of the interference device 41 or 42 such as an analyzer may be in the middle of a separated polarization direction.

For example, the polarizing optical element 31' may equally divide 360 degrees around the optical axis C of the reflected light R11 on the plane orthogonal to the optical axis C. For example, the polarizing optical element 31' may be divided into four quadrants on the plane orthogonal to the optical axis C of the reflected light R11. As described above, the polarizing optical element 31' may include a plurality of sections 31a through 31d each having a division angle α, which is obtained by equally dividing an angle of a single rotation around the optical axis C. The apex of the division angle α is the optical axis C. For example, the polarizing optical element 31' may include four sections 31a through 31d each having a rectangular shape. Each of the sections 31a through 31d may have the optical axis C as one apex and have the division angle α as one of four angles of α rectangle. Each of the sections 31a through 31d may separate the reflected light R11 incident thereto into two linearly polarized light beams travelling in a direction orthogonal to the bisector of the division angle α. In other words, the polarizing optical element 31' may separate the reflected light R11 into two linearly polarized light beams travelling in a diagonal direction that does not include the optical axis C. The travelling direction of the two linearly polarized light beams separated from the reflected light R11 may be tangent to the circumferential direction around a polarization axis. The polarizing optical element 31' is not limited to an optical element that is divided into four quadrants, as shown in FIG. 10, and may include any number of sections obtained by equally dividing 360 degrees around the optical axis C (for example, by eight). Similarly to the polarizing optical element 31', the polarizing optical element 32' may include four sections 32a through 32d, which have a rectangular shape and are obtained by equally dividing 360 degrees around the optical axis C.

The sections 31a and 31c may face each other with the optical axis C therebetween, and the sections 31b and 31d may face each other with the optical axis C therebetween. Directions in which the sections 31a and 31c respectively separate portions of the reflected light R11 may be parallel with each other, and directions in which the sections 31b and 31d respectively separate portions of the reflected light R11 may be parallel with each other. A direction in which one of the sections 31a through 31d separates a portion of the reflected light R11 may be orthogonal to a direction in which an adjacent one of the sections 31a through 31d separates a portion of the reflected light R11. For example, a direction in which each of the sections 31a and 31c separates a portion of the reflected light R11 may be orthogonal to a direction in which either of the sections 31b and 31d separates a portion of the reflected light R11.

A direction of the transmission axis 41a of the interference device 41 may be between the separating directions of the sections 31a and 31c and the separating directions of the sections 31b and 31d.

A central portion of the conjugate pupil position 21h (e.g., a conjugate pupil plane) on the image detector 50 may correspond to the reflected light R10 in the case where the illumination light L10 is vertically incident to the measurement surface 71 of the sample 70. The peripheral portion of a pupil plane may correspond to the reflected light R10 in the case where the illumination light L10 is obliquely incident to the measurement surface 71. When an incident angle of the illumination light L10 to the measurement surface 71 changes during measurement using the ellipsometer 2, the ellipsometric parameters Ψ and Δ may also change.

Accordingly, in the present embodiment, each of the polarizing optical elements 31' and 32' may be divided into four sections, and the separating direction of each section may be the circumferential direction around the optical axis C. When Equation 1 is fitted to the interference fringe 51 of the reflected light R11, Equations 1 and 2 are fitted to a profile in a set range. In this case, to maintain the incident angle of the illumination light L10 constant, the profile of an interference fringe in the circumferential direction around the optical axis C may be used.

Figure 11:
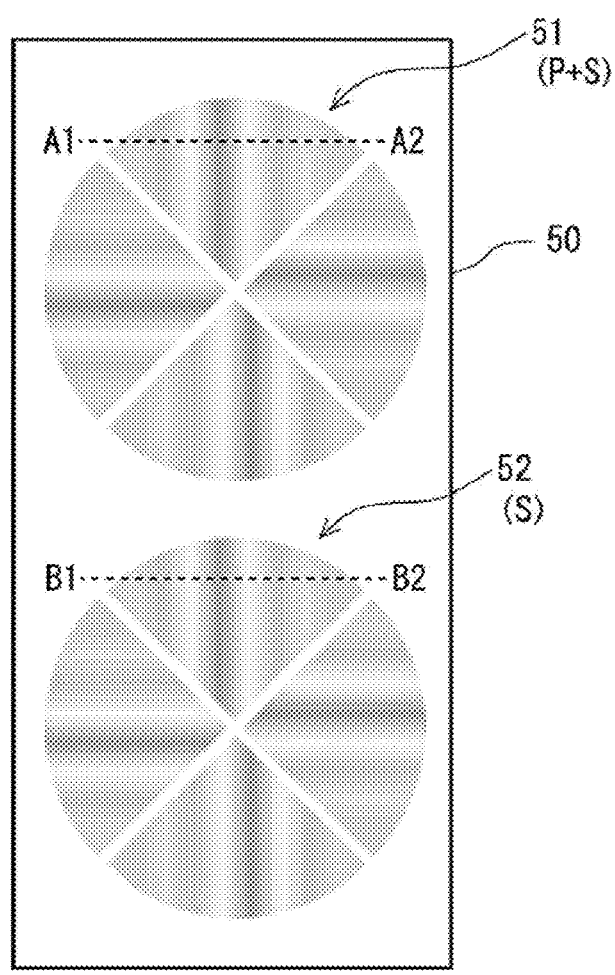
FIG. 11 is a diagram illustrating interference fringes of reflected lights having interference occurring in an image detector of the ellipsometer according to Embodiment 2.

FIG. 11 is a diagram illustrating the interference fringes 51 and 52 of the reflected lights R11 and R13 having interference occurring in the image detector 50 of the ellipsometer 2, according to Embodiment 2. The upper part of FIG. 11 shows the interference fringe 51 of the reflected light R11, and the lower part of FIG. 11 shows the interference fringe 52 of the reflected light R13. As shown in FIG.

11, the interference fringe 51 that is divided into four sections like the polarizing optical element 31' is formed in the circumferential direction. The interference fringe 51 has a line A1-A2 in the circumferential direction around the optical axis C. Therefore, the reflected light R11 resulting from the illumination light L10 incident to the measurement surface 71 of the sample 70 at a constant angle may be fitted. Accordingly, the ellipsometric parameters Ψ and Δ may be measured at high precision.

The reflected light R12 reflected from the separation unit 22 may be incident to the separation unit 23 such as a polarizing beam splitter. The separation unit 23 may separate the reflected light R12 into the reflected light R13 with s-polarization and reflected light with p-polarization. For example, the separation unit 23 may reflect an s-polarization component and transmit a p-polarization component. The reflected light R13 from the separation unit 23 may include a polarization component which is in s-polarization state on the measurement surface 71 at the position D2 in FIG. 9. The position D2 refers to a portion of the cross-section of the reflected light R13. The reflected light R13 reflected from the separation unit 23 may be incident to the azimuth polarizer 25.

Figure 12:
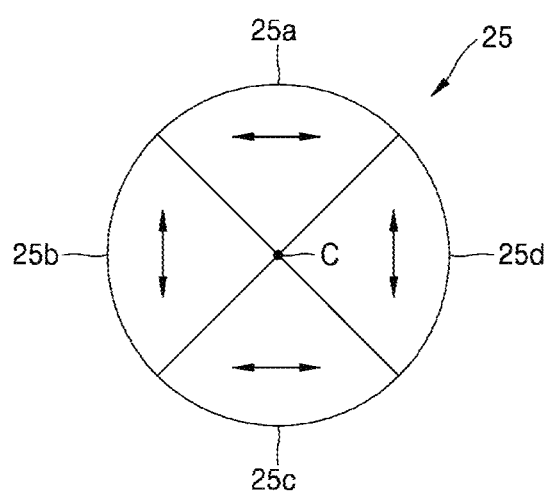
FIG. 12 is a plan view of an azimuth polarizer of the ellipsometer according to Embodiment 2.

FIG. 12 is a plan view of an azimuth polarizer of the ellipsometer, according to Embodiment 2. As shown in FIG. 12, the azimuth polarizer 25 may be divided into sections 25a through 25d according to the division of the polarizing optical element 32'. The azimuth polarizer 25 may include a plurality of fan-shaped sections respectively having central angles, into which the angle of a single rotation around the optical axis C of the reflected light R13 is equally divided, on a plane orthogonal to the optical axis C of the reflected light R13. In detail, the azimuth polarizer 25 may be divided into the four sections 25a through 25d, each of which has a central angle of 90 degrees and a fan shape.

The sections 25a through 25d may respectively correspond to sections 32a through 32d. Each of the sections 25a through 25d may transmit polarization in the transmission axis thereof. The reflected light R13 transmitted by each of the sections 25a through 25d may be incident to a corresponding one of the sections 32a through 32d.

The λ/4 wave plate 24 may convert the reflected light R13 into polarized light in a direction that is different from the s-polarization direction and the p-polarization direction. For example, the λ/4 wave plate 24 may rotate the polarization direction of an s-polarization component 45 degrees around the polarization axis of the reflected light R13. The reflected light R13 may include a polarization component in a different direction than the reflected light R12 at the position D3 in FIG. 9. The position D3 refers to a portion of the cross-section of the reflected light R13. The reflected light R13 may include a polarization component, which is in s-polarization state on the measurement surface 71, having a different polarization direction than the reflected light R12. The reflected light R13 may be incident to the polarizing optical element 32'.

Directions, in which the sections 32a and 32c facing each other with the optical axis C therebetween respectively separate portions of the reflected light R13, may be parallel with each other. Directions, in which the sections 32b and 32d respectively separate portions of the reflected light R13, may be parallel with each other. A direction in which one of the sections 32a through 32d separates a portion of the reflected light R13 may be orthogonal to a direction in which an adjacent one of the sections 32a through 32d separates a portion of the reflected light R13. In other words, a direction in which each of the sections 32a and 32c separates a portion of the reflected light R13 may be orthogonal to a direction in which either of the sections 32b and 32d separates a portion of the reflected light R13.

A direction of the transmission axis 42a of the interference device 42 may be between the separating directions of the sections 32a and 32c and the separating directions of the sections 32b and 32d.

In the present embodiment, two interference fringes 51 and 52 are formed on the image detector 50. Each of the interference fringes 51 and 52 are radially divided into four sections. When performing signal processing on the interference fringes 51 and 52, the analysis system 60 may obtain an intensity distribution in a line, e.g., line A1-A2 or line B1-B2 in FIG. 11, perpendicular to the direction of each of the interference fringes 51 and 52. Then, the analysis system 60 may perform signal processing similar to that described with reference to FIG. 7. In this case, the image detector 50 is located at the conjugate pupil position 21h of the light receiving optical system 20, and different positions on the image detector 50 correspond to different incident angles and different incident azimuths to the measurement surface 71. For example, different pixels of an image measured by the image detector 50 respectively correspond to different incident angles and different incident azimuths to the measurement surface 71. Accordingly, when a location, e.g., the line A1-A2, in which the intensity distribution of the interference fringe 51 is obtained, is changed, the ellipsometric parameters Ψ and Δ at different incident angles and different incident azimuths may be obtained. A location changed from the line A1-A2 may be parallel with the line A1-A2 and perpendicular to the direction of the interference fringe 51 but is not limited thereto.

The optical axis of the illumination light L10 incident to the measurement surface 71 and the optical axis of the reflected light R10 from the measurement surface 71 may be orthogonal to the measurement surface 71. Accordingly, the ellipsometric parameters Ψ and Δ may be simultaneously obtained at a plurality of incident angles and incident azimuths to the measurement surface 71. Accordingly, the throughput of measurement of the ellipsometric parameters Ψ and Δ may be increased. Because the measurement throughput may be increased, the ellipsometer 2 may be used, as an OCD measuring device, in a semiconductor inspection device.

Each of the polarizing optical elements 31' and 32' may include sections around the polarization axis thereof. Accordingly, the profile of an interference fringe in the circumferential direction around the optical axis C may be obtained, and therefore, the precision of the ellipsometric parameters Ψ and Δ may be increased. Other configurations and effects of the ellipsometer 2 are included in the descriptions of the ellipsometer 1 according to Embodiment 1.

Embodiment 3

Figure 13:
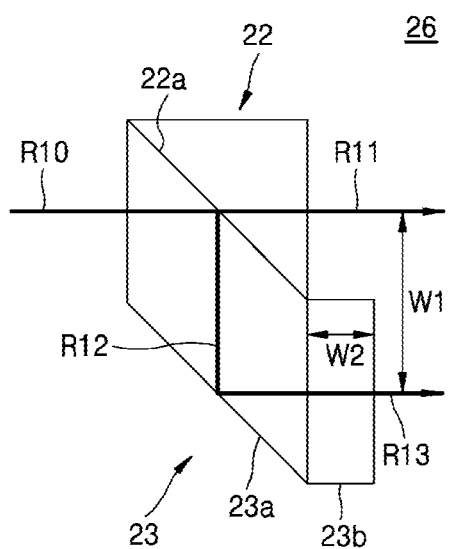
FIG. 13 is a cross-sectional view of a separation unit of the ellipsometer according to Embodiment 1 or 2.

FIG. 13 is a cross-sectional view of a separation unit of the ellipsometer 1 or 2, according to Embodiment 1 or 2.

As shown in FIG. 13, each of the ellipsometers 1 and 2 may include a beam splitter 26 corresponding to a combination of the separation units 22 and 23. The separation unit 22 of the beam splitter 26 may include a non-polarizing beam splitter film 22a. The separation unit 23 may include a polarizing beam splitter film 23a. In the beam splitter 26, the non-polarizing beam splitter film 22a and the polarizing beam splitter film 23a may be arranged to be parallel with each other. For example, the beam splitter 26 may include a transparent optical element such as glass and the non-polarizing beam splitter film 22a and the polarizing beam splitter film 23a, which are arranged on the transparent optical element.

The reflected light R10 may be incident to the non-polarizing beam splitter film 22a at an angle of 45 degrees. The reflected light R11 may be a portion of the reflected light R10, which passes through the non-polarizing beam splitter film 22a.

The reflected light R12 may be a portion of the reflected light R10, which is reflected from the non-polarizing beam splitter film 22a. The reflected light R12 may be incident to the polarizing beam splitter film 23a at an angle of 45 degrees. The reflected light R13 may be a portion of the reflected light R12, which is reflected from the polarizing beam splitter film 23a.

The direction of the reflected light R10 incident to the beam splitter 26 may be parallel with the directions of the reflected light R11 and the reflected light R13, which are output from the beam splitter 26. Accordingly, it may be easy to design the layout of optical elements of the ellipsometer 1 or 2, and design freedom may be increased. However, the optical path length of the reflected light R11 in the glass (i.e., in the separation unit 22) is different from the optical path length of the reflected light R13 in the glass (i.e., in the separation unit 23). In other words, the optical path of the reflected light R13 may be longer than that of the reflected light R11 by a distance W1 that the reflected light R12 travels. In this case, there may be an issue of axial chromatic aberration.

Therefore, a thickness W2 of an optical path length compensator 23b may be set such that an air-equivalent length is the same between the reflected light R11 and the reflected light R13 (i.e., W2=W1/(n−1)). Here, "n" is a refractive index of the glass.

Figure 14:
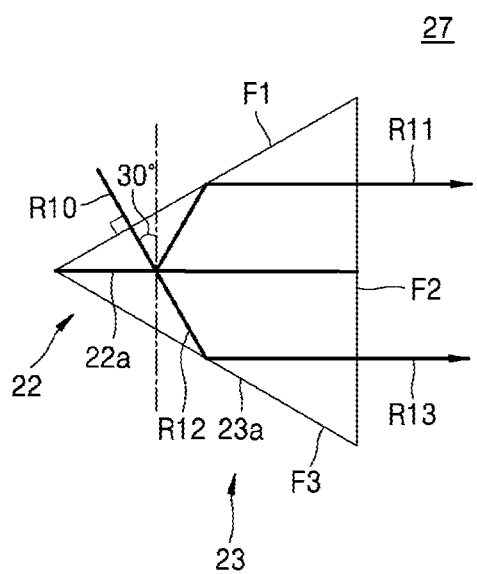
FIG. 14 is a cross-sectional view of a separation unit of an ellipsometer according to Embodiment 3.

FIG. 14 is a cross-sectional view of a separation unit of an ellipsometer 3, according to Embodiment 3. The present embodiment is an example of modifying the separation units 22 and 23 of the ellipsometers 1 and 2 into a beam splitter 27. As shown in FIG. 14, the beam splitter 27 may include the separation units 22 and 23. The separation unit 22 may include the non-polarizing beam splitter film 22a, and the separation unit 23 may include the polarizing beam splitter film 23a. In the beam splitter 27, the separation units 22 and 23 may be integrated into a transparent optical element such as triangular prism-shaped glass. Three sides of the triangular prism of the transparent optical element may include an entry plane F1 to which the reflected light R10 is incident, an exit plane F2 from which the reflected light R11 and the reflected light R13 are output, and a reflective plane F3 from which the reflected light R12 is reflected. In this case, the polarizing beam splitter film 23a may be on the inside of the reflective plane F3. The non-polarizing beam splitter film 22a may be on a plane that bisects an angle between the entry plane F1 and the reflective plane F3. An angle between non-polarizing beam splitter film 22a and the polarizing beam splitter film 23a may be 30 degrees.

The reflected light R10 may be vertically incident to the entry plane F1. The reflected light R10 may be incident to the non-polarizing beam splitter film 22a at an angle of 30 degrees. A portion of the reflected light R10 may be reflected from the non-polarizing beam splitter film 22a and thus become the reflected light R11, and another portion of the reflected light R10 may pass through the non-polarizing beam splitter film 22a and thus become the reflected light R12.

The reflected light R11 reflected from the non-polarizing beam splitter film 22a may be at an angle greater than the angle of total reflection with respect to the inside of the entry plane F1 and thus totally reflected from the entry plane F1. The reflected light R1 reflected from the inside of the entry plane F1 may be output from the exit plane F2 to be orthogonal to the exit plane F2.

In the beam splitter 27, the reflected light R12 corresponds to a portion of the reflected light R10, which passes through the non-polarizing beam splitter film 22a. The reflected light R12 may be incident to the polarizing beam splitter film 23a at an angle of 60 degrees. The reflected light R13 reflected from the polarizing beam splitter film 23a may be output from the exit plane F2 to be orthogonal to the exit plane F2.

In the beam splitter 27, an optical path length may be the same between the reflected light R11 and the reflected light R13 inside the glass. However, it may be necessary to consider a phase difference, which may be caused by total reflection on the inside of the entry plane F1, and angle difference in between the traveling direction of the incident light and the traveling direction of the exit light.

Figure 15:
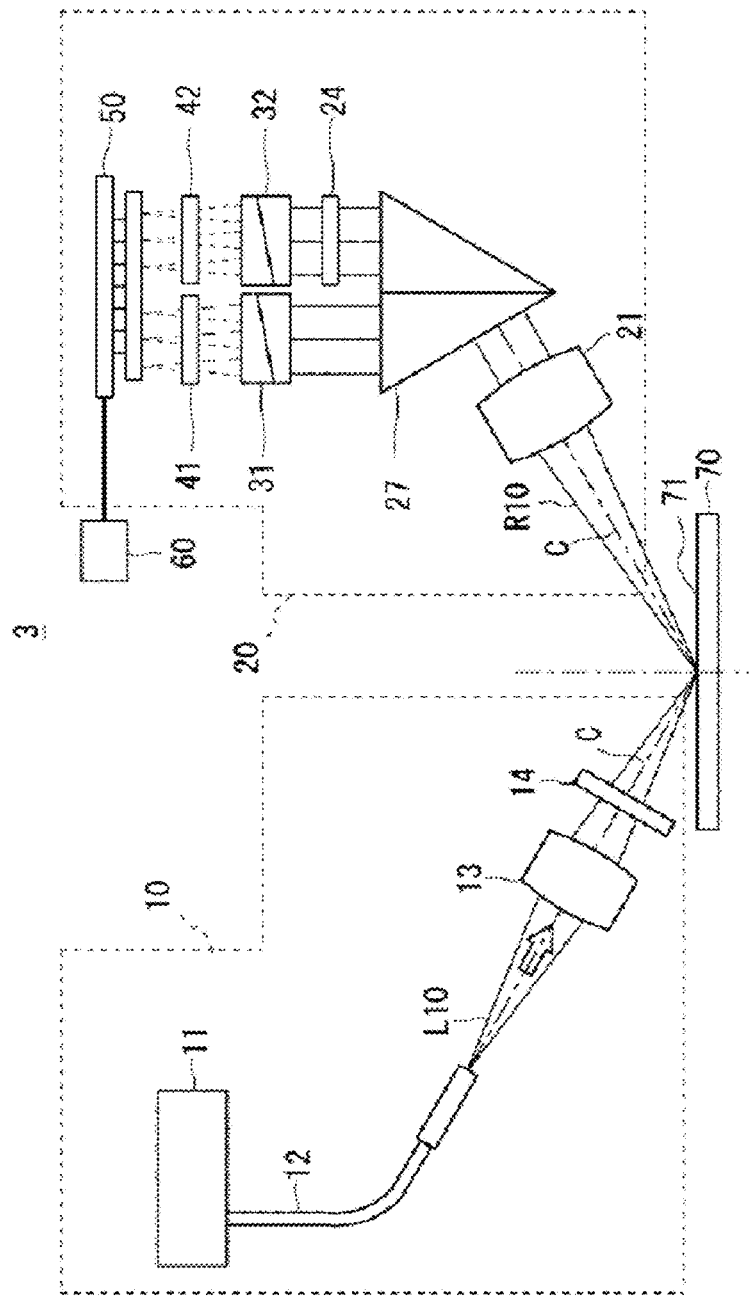
FIG. 15 is a configuration diagram of the ellipsometer according to Embodiment 3.

FIG. 15 is a configuration diagram of the ellipsometer 3 according to Embodiment 3. As shown in FIG. 15, the separation units 22 and 23 of the ellipsometer 1 are replaced with the beam splitter 27 in the ellipsometer 3. This configuration may allow the optical path length of the reflected light R11 in the separation unit 22 to be the same as that of the reflected light R13 in the separation unit 23 and thus suppress axial chromatic aberration. In addition, the image detector 50 may vertically receive the reflected light R11 and the reflected light R13, and accordingly, the design freedom of an optical device may be increased. Other configurations and effects of the ellipsometer 3 are included in the descriptions of Embodiments 1 and 2.

Embodiment 4

In an ellipsometer 4 according to the present embodiment, the interference devices 41 and 42 of the light receiving optical system 20 are integrated into a polarizing beam splitter 43.

Figure 16:
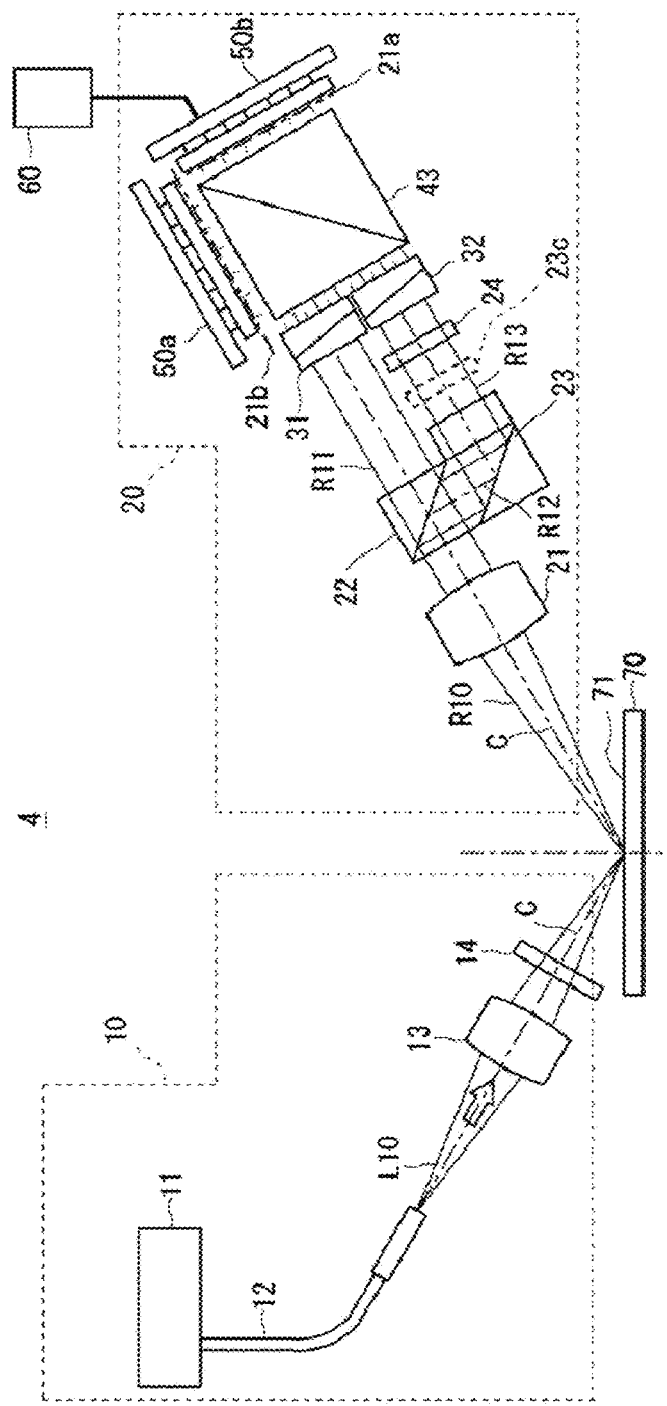
FIG. 16 is a configuration diagram of an ellipsometer according to Embodiment 4.

FIG. 16 is a configuration diagram of the ellipsometer 4 according to Embodiment 4. As shown in FIG. 16, the ellipsometer 4 may include the light receiving optical system 20 in which the polarizing beam splitter 43 and two image detectors 50a and 50b are integrated with each other.

In Embodiment 1 described above with reference to FIG. 1, the interference devices 41 and 42 may transmit 45-degree components of two linearly polarized light beams, which are separated by the polarizing optical elements 31 and 32 in a 0°-polarization direction and a 90°-polarization direction, and allow the 45-degree components to interfere with each other. In this case, the interference device 41 may absorb or reflect a 135-degree component.

Referring to FIG. 16, the polarizing beam splitter 43 may reflect a 45-degree component and transmit a 135-degree component, according to example embodiments. As described above, the polarizing beam splitter 43 may reflect a component in a first direction, which is different from the two linear polarization directions, among two linearly polarized components orthogonal to each other. The polarizing beam splitter 43 may transmit a component in a second direction, which is perpendicular to the first direction, among two linearly polarized components orthogonal to each other. In detail, the polarizing beam splitter 43 may reflect linearly polarized light in a 45-degree direction among linearly polarized light from the polarizing optical elements 31 and transmit linearly polarized light in a 135- degree direction. The descriptions of the polarizing beam splitter 43 and the polarizing optical elements 31 are similarly applied to the descriptions of the polarizing beam splitter 43 and the polarizing optical elements 32.

The ellipsometer 4 may include the image detectors 50a and 50b. The image detector 50a may detect an interference fringe of a polarized component reflected (i.e., in the 45-degree direction) from the polarizing beam splitter 43. The image detector 50b may detect an interference fringe of a polarized component that has passed through (i.e., in the 135-degree direction) the polarizing beam splitter 43.

Figure 17:
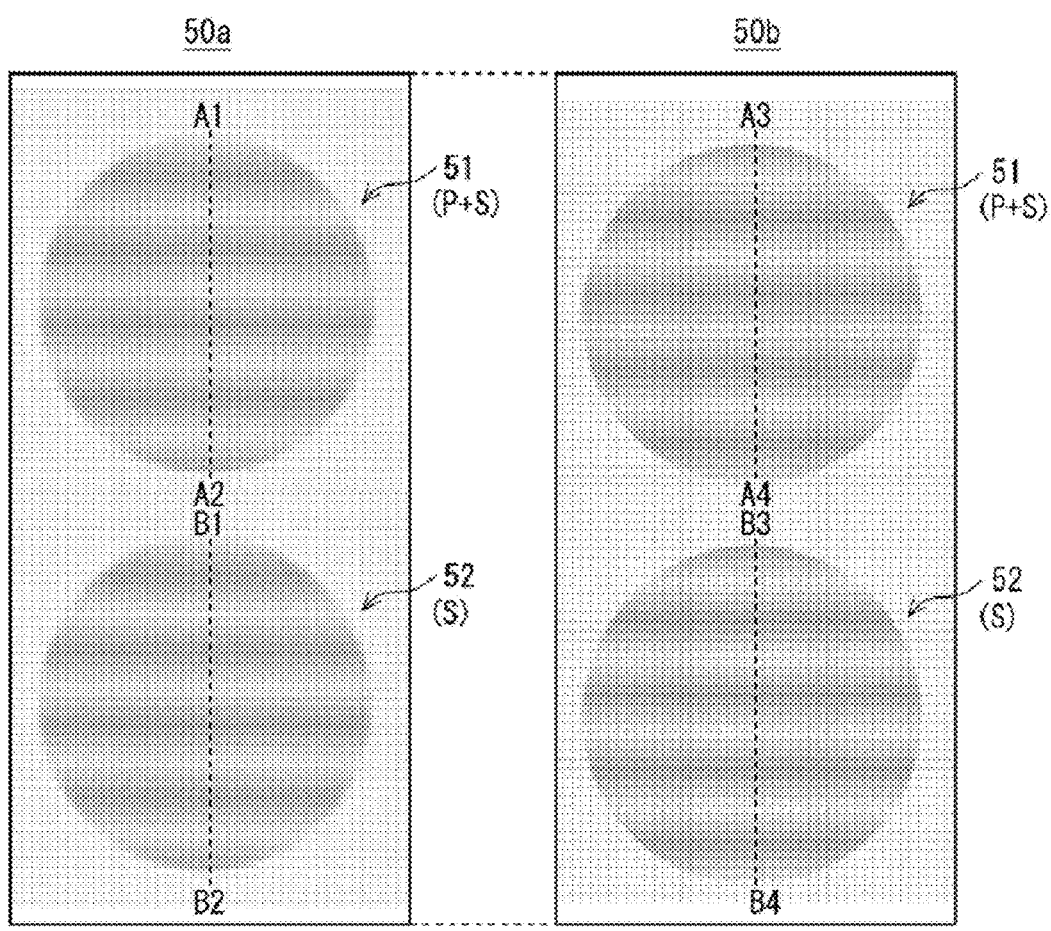
FIG. 17 is a diagram illustrating an interference fringe of reflected light having interference occurring in each of two image detectors of the ellipsometer according to Embodiment 4.
Figure 18:
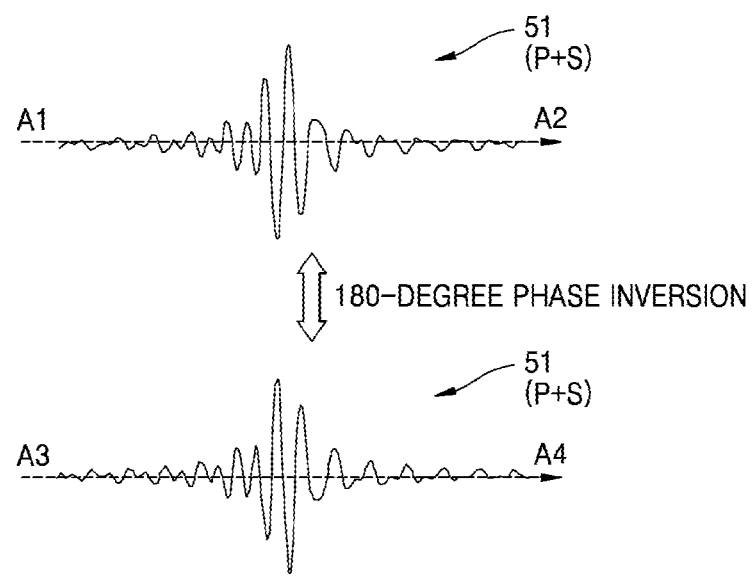
FIG. 18 illustrates graphs of the intensities of interference fringes detected by image detectors of the ellipsometer according to Embodiment 4.

FIG. 17 is a diagram illustrating an interference fringe of reflected light having interference occurring in each of two image detectors of the ellipsometer, according to Embodiment 4. FIG. 18 illustrates graphs of the intensities of interference fringes detected by image detectors of the ellipsometer 4, according to Embodiment 4. In FIG. 18, the horizontal axis is a position of an interference fringe and the vertical axis is an intensity distribution. As shown in FIGS. 17 and 18, the phase of the interference fringes 51 and 52 on the image detector 50a is 180-degree inverted on the image detector 50b.

Figure 19:
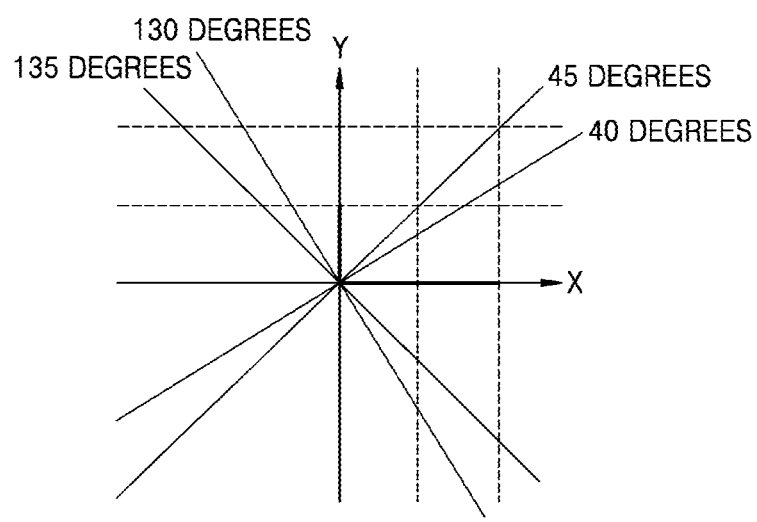
FIG. 19 is a diagram for describing a polarizing beam splitter of the ellipsometer according to Embodiment 4.

FIG. 19 is a diagram illustrating a component when reflection and transmission polarization directions of the polarizing beam splitter 43 is deviated from 45 degrees with respect to two linear directions resulting from separation of the polarizing optical element 31 in an ellipsometer, according to Embodiment 4.

As shown in FIG. 19, the case where the intensity of an X-direction component of either the reflected light R11 or the reflected light R13 is different from the intensity of a Y-direction component thereof (e.g., when the intensity of an X-direction component is 2 and the intensity of a Y-direction component is 1) is exemplarily described. When the reflection and transmission polarization directions of the polarizing beam splitter 43 are changed from 45 degrees to 40 degrees with respect to two linear directions resulting from separation of the polarizing optical elements 31 and 32, the X-direction component may increase and the Y-direction component may decrease. In detail, the projection of the X-direction component with respect to 40 degrees may be larger than the projection of the X-direction component with respect to 45 degrees, and the projection of the Y-direction component with respect to 40 degrees may be smaller than the projection of the Y-direction component with respect to 45 degrees. Accordingly, when the reflection and transmission polarization directions of the polarizing beam splitter 43 are changed from 45 degrees to 40 degrees, the difference between the X-direction component and the Y-direction component may increase and contrast may decrease.

When the reflection and transmission polarization directions of the polarizing beam splitter 43 are changed from 135 degrees to 130 degrees, the X-direction component may decrease and the Y-direction component may increase. In detail, the projection of the X-direction component with respect to 130 degrees may be smaller than the projection of the X-direction component with respect to 135 degrees, and the projection of the Y-direction component with respect to 130 degrees may be larger than the projection of the Y-direction component with respect to 135 degrees. Accordingly, when the reflection and transmission polarization directions of the polarizing beam splitter 43 are changed from 135 degrees to 130 degrees, the difference between the X-direction component and the Y-direction component may decrease and contrast may increase. In Embodiment 1, contrast also decreases when the intensity of either of two linearly polarized light beams, which result from separation of each of the polarizing optical elements 31 and 32, decreases.

In this case, the intensity of which of the two linearly polarized light beams decreases may not be identified. However, in the present embodiment, the intensity of which of the two linearly polarized light beams decreases may be identified.

According to the present embodiment, the ellipsometer 4 may form additional interference fringes 51 and 52 on the image detector 50b using the polarizing beam splitter 43 instead of an analyzer such as the interference device 41 or 42 and obtain additional information. In detail, when an analyzer is used, information included in polarized light in a direction perpendicular to the polarization axis of the analyzer is discarded. Differently, when the polarizing beam splitter 43 is used, information included in polarized light in a direction perpendicular to the polarization axis and information included in polarized light in a direction parallel with the polarization axis may all be detected. Accordingly, a component, which is discarded in the case of an analyzer, may be used for detection, and accordingly, a signal-to-noise ratio may be increased. In addition, the interference fringes 51 in a 180-degree phase inverted relationship and the interference fringes 52 in a 180-degree phase inverted relationship may be formed. According to example embodiments, when the image detectors 50a and 50b forming the interference fringes 51 in a 180-degree phase inverted relationship and the interference fringes 52 in a 180-degree phase inverted relationship is used for detection, a low-intensity point corresponding to a position of a valley in the interference fringes 51 and 52 detected using only one image detector 50 may be made into a high-intensity point corresponding to a position of a peak. Accordingly, information may be obtained from more parts of the interference fringes 51 and 52 by complementarily using the image detectors 50a and 50b.

Although it is illustrated in FIG. 16 that the reflected light R11 reflected from the polarizing beam splitter 43 and the reflected light R13 transmitted by the polarizing beam splitter 43 travel in two directions on a plane parallel with FIG. 16, the reflected light R11 and the reflected light R13 actually travel in a 45-degree tilted direction. Other configurations and effects of the ellipsometer 4 are included in the descriptions of Embodiments 1 through 3.

Embodiment 5

An ellipsometer 5 of the present embodiment may not use Nomarski prisms as the polarizing optical elements 31 and 32.

Figure 20:
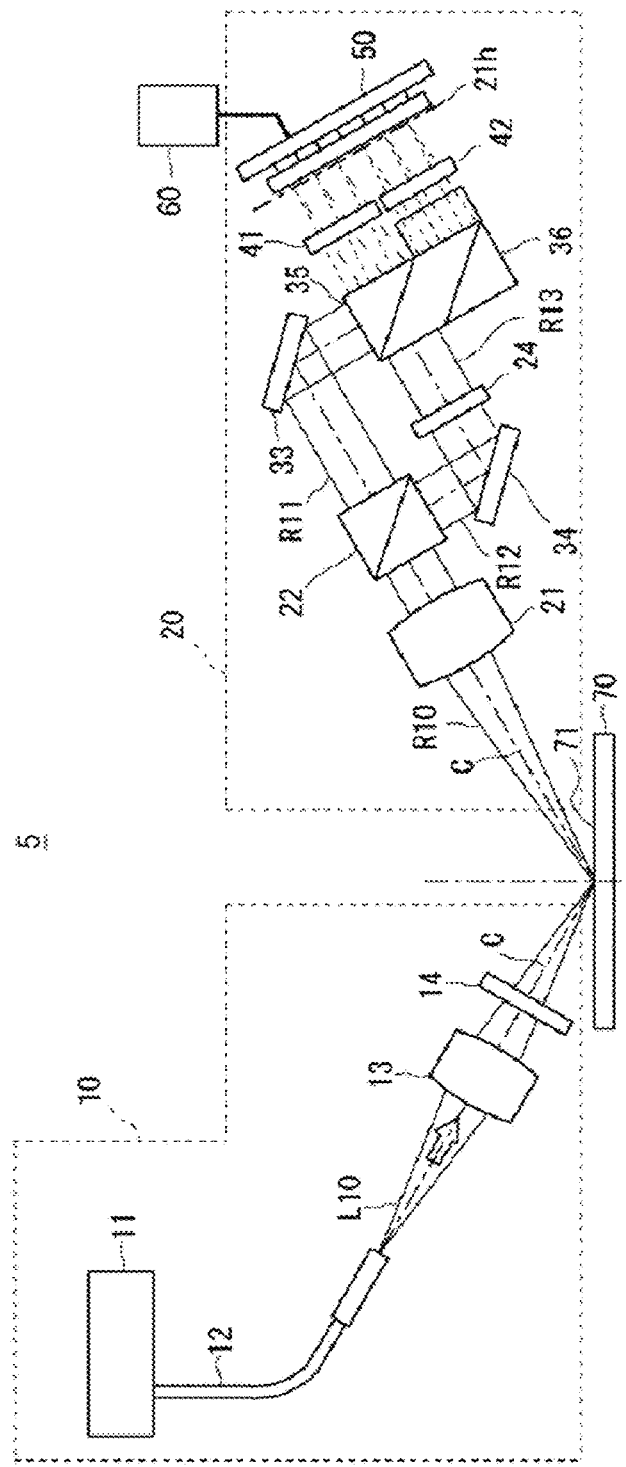
FIG. 20 is a configuration diagram of an ellipsometer according to Embodiment 5.
Figure 21:
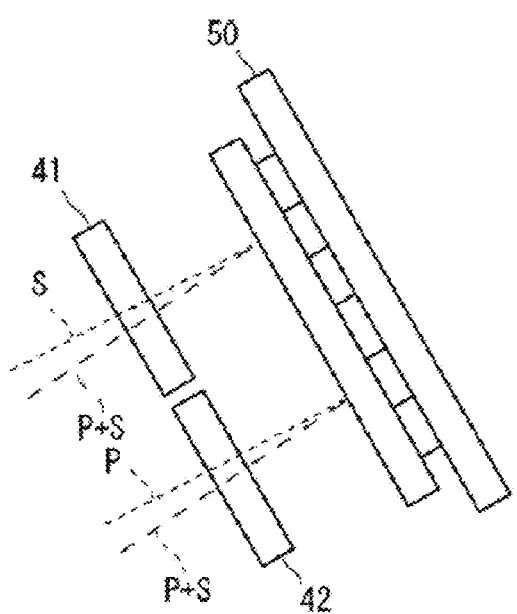
FIG. 21 is a diagram illustrating an interference device and an image detector in the ellipsometer according to Embodiment 5.
Figure 22:
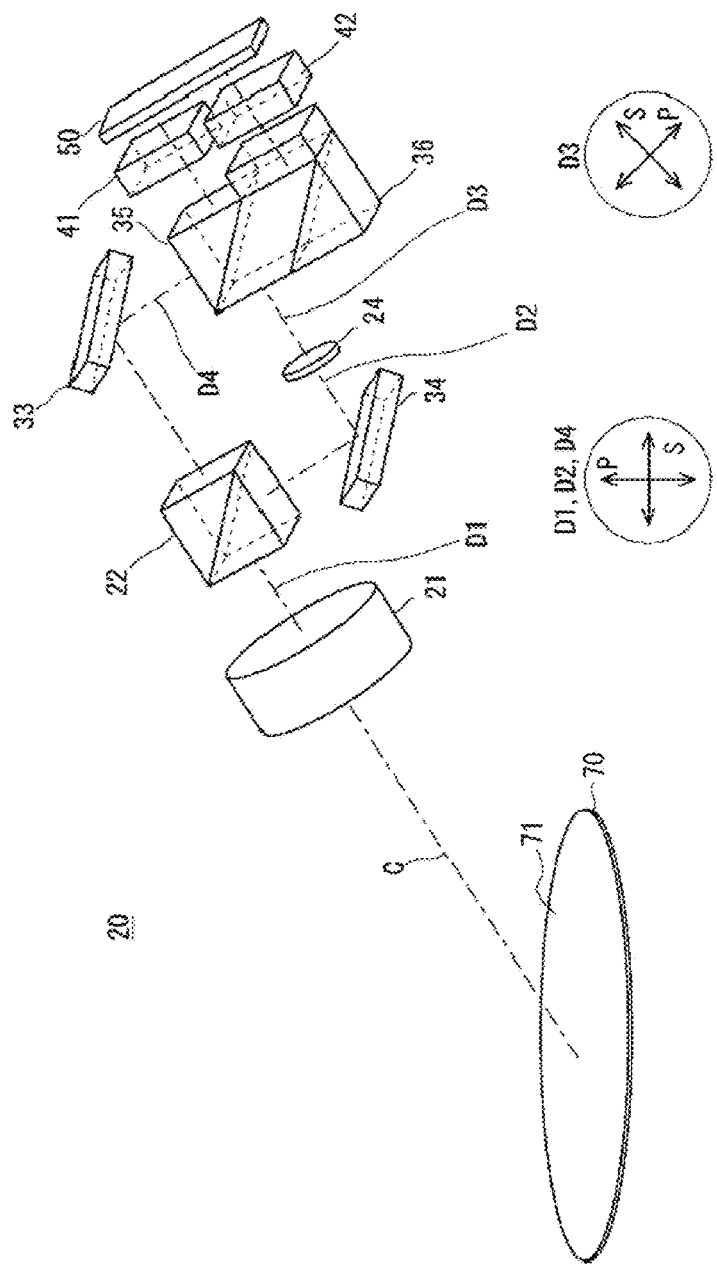
FIG. 22 is a diagram illustrating a light receiving optical system of the ellipsometer according to Embodiment 5.

FIG. 20 is a configuration diagram of the ellipsometer 5 according to Embodiment 5. FIG. 21 is a diagram illustrating an interference device and an image detector in the ellipsometer 5, according to Embodiment 5. FIG. 22 is a diagram illustrating a light receiving optical system of the ellipsometer 5, according to Embodiment 5.

As shown in FIGS. 20 through 22, the light receiving optical system 20 of the ellipsometer 5 may include the collimating lens 21, the separation unit 22 such as a non-polarizing beam splitter, mirrors 33 and 34, the λ/4 wave plate 24, separation units 35 and 36, the interference devices 41 and 42, and the image detector 50.

The reflected light R10 passing through the collimating lens 21 may include a p-polarization component on the measurement surface 71 and an s-polarization component on the measurement surface 71 at the position D1 in FIG. 22.

The reflected light R10 may be separated into the reflected light R11 and the reflected light R12 by the separation unit 22. The reflected light R11 from the separation unit 22 may be incident to the mirror 33. The mirror 33 may reflect the reflected light R11. The reflected light R11 reflected from the mirror 33 may include a p-polarized component on the measurement surface 71 and an s-polarized component on the measurement surface 71 at the position D4 in FIG. 22. The reflected light R11 reflected from the mirror 33 may be incident to the separation unit 35 such as a polarizing beam splitter. The separation unit 35 may reflect an s-polarized component of the reflected light R11 and transmit a p-polarized component of the reflected light R11. The p-polarized component of the reflected light R11, which has passed through the separation unit 35, may be reflected from the separation unit 36 such as a polarizing beam splitter.

The reflected light R12 from the separation unit 22 may be incident to the mirror 34. The mirror 34 may reflect the reflected light R12. The reflected light R12 reflected from the mirror 34 may include a p-polarized component on the measurement surface 71 and an s-polarized component on the measurement surface 71 at the position D2 in FIG. 22. The reflected light R12 reflected from the mirror 34 may be incident to the λ/4 wave plate 24. Each of the p- and s-polarized components of the reflected light R12 may be rotated by the λ/4 wave plate 24 45 degrees around a polarization axis. As described above, the λ/4 wave plate 24 may convert the p-polarized component of the reflected light R12 reflected from the mirror 34 into a linearly polarized component in a direction different from each of the s- and p-polarization directions and convert the s-polarized component of the reflected light R12 reflected from the mirror 34 into a linearly polarized component in a direction different from each of the s- and p-polarization directions. The reflected light R12 that has passed through the λ/4 wave plate 24 is referred to as the reflected light R13. The reflected light R13 may include a 45-degree tilted p-polarization component and a 45-degree tilted s-polarization component at the position D3 in FIG. 22.

The reflected light R13 may be incident to the separation unit 35. The separation unit 35 may partially transmit and partially reflect the reflected light R13 including the 45-degree tilted p-polarization component and the 45-degree tilted s-polarization component. The reflected light R13 reflected from the separation unit 35 may be incident to the separation unit 36. The separation unit 36 may reflect a portion of the reflected light R13 including a 45-degree tilted p-polarization component and a 45-degree tilted s-polarization component.

As described above, the separation unit 35 may reflect an s-polarized component of the reflected light R11 reflected from the mirror 33 and transmit a p-polarized component of the reflected light R11 reflected from the mirror 33. The separation unit 35 may also transmit a 45-degree tilted p-polarization component and a 45-degree tilted s-polarization component of the reflected light R13 from the λ/4 wave plate 24. The separation unit 36 may reflect a p-polarized component of the reflected light R11 transmitted by the separation unit 35 and also reflect a 45-degree tilted p-polarized component and a 45-degree tilted s-polarized component of the reflected light R13 reflected from the separation unit 35.

In the present embodiment, the reflected light R11 and the reflected light R13 join together in the separation units 35 and 36, pass through the interference devices 41 and 42, and form the interference fringes 51 and 52 on the image detector 50. The interference device 41 may form the interference fringe 51 by allowing a component in the direction of the transmission axis 41a among s-polarization components reflected from the separation unit 35 and a component in the direction of the transmission axis 41a among 45-degree tilted p- and s-polarization components transmitted by the separation unit 35 to interfere with each other. The interference device 42 may form the interference fringe 52 (by allowing a polarization component in the direction of the transmission axis 42a among p-polarization components reflected from the separation unit 36 and a polarization component in the direction of the transmission axis 42a among 45-degree tilted p-polarization component and s-polarization component reflected from the separation unit 36 to interfere with each other.

An optical system of the ellipsometer 5 may be configured such that the reflected light R11 and the reflected light R13 join together and obliquely reach the same position on the image detector 50. In other words, the position and slope of each of the mirrors 33 and 34 may be adjusted such that the reflected light R11 and the reflected light R13 output from each of the separation units 35 and 36 obliquely reach the same position on the image detector 50.

Due to this configuration, a p-polarization component of the reflected light R11 interferes with a p-polarization component that is oblique 45 degrees to the p-polarization direction of the reflected light R13 and with an s-polarization component that is oblique 45 degrees to the s-polarization direction of the reflected light R13, thereby forming the interference fringe 51. In addition, an s-polarization component of the reflected light R11 interferes with a p-polarization component that is oblique 45 degrees to the p-polarization direction of the reflected light R13 and with an s-polarization component that is oblique 45 degrees to the s-polarization direction of the reflected light R13, thereby forming the interference fringe 52.

Figure 23:
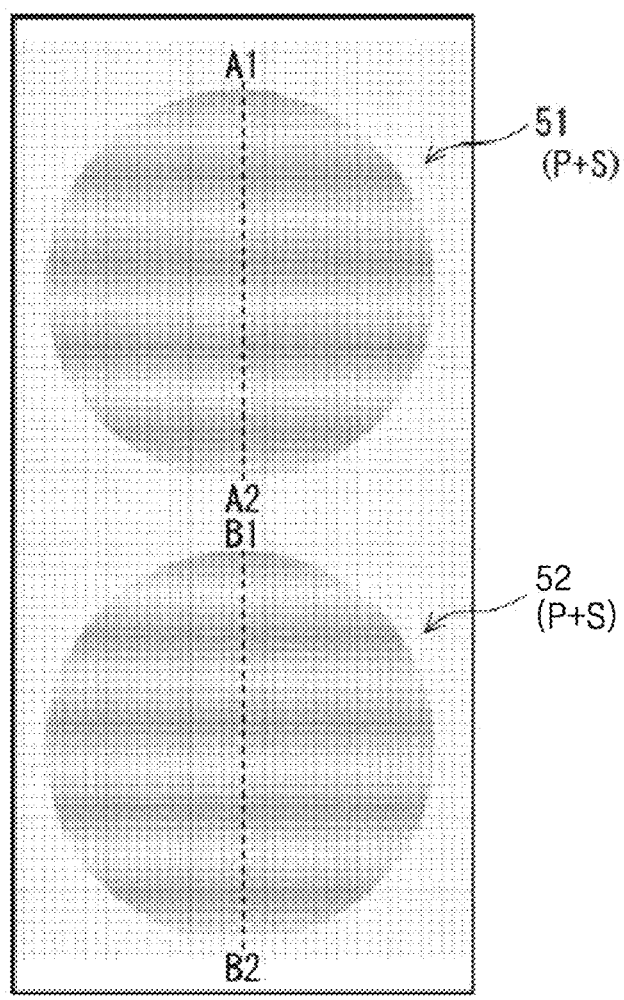
FIG. 23 is a diagram illustrating interference fringes of reflected lights having interference occurring in the image detector of the ellipsometer according to Embodiment 5.
Figure 24:
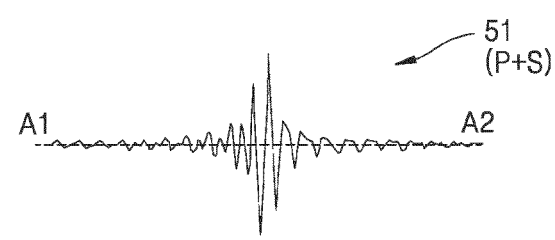
FIG. 24 illustrates graphs of the intensities of interference fringes detected by the image detector of the ellipsometer according to Embodiment 5.
Figure 24:
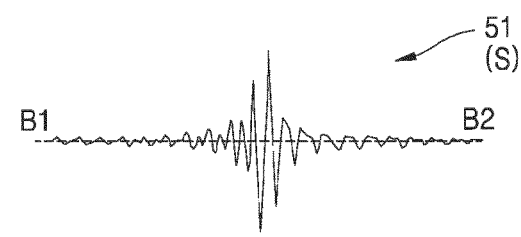
Figure 25:
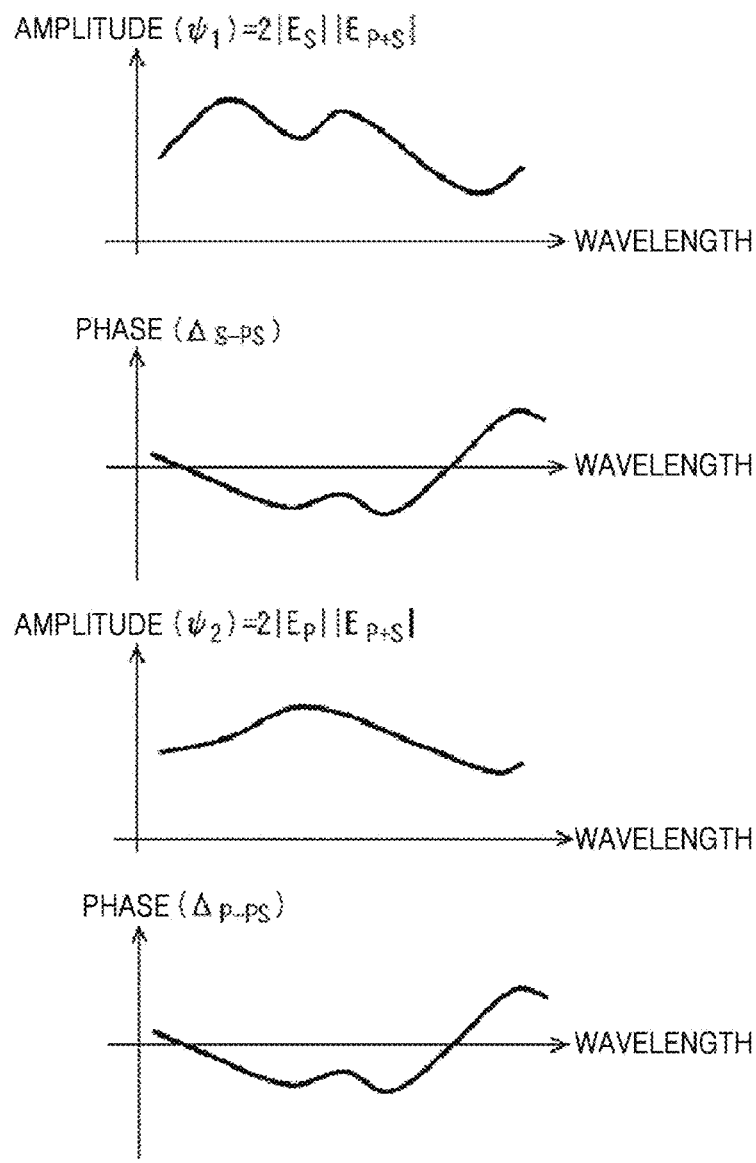
FIG. 25 illustrates graphs to describe the analysis of an interference fringe detected by an image detector of the ellipsometer according to Embodiment 5.

FIG. 23 is a diagram illustrating interference fringes of reflected lights having interference occurring in an image detector of the ellipsometer 5, according to Embodiment 5. FIG. 24 illustrates graphs of the intensities of interference fringes detected by an image detector of the ellipsometer 5, according to Embodiment 5. In FIG. 24, the horizontal axis is a position of an interference fringe and the vertical axis is an intensity distribution. FIG. 25 shows graphs illustrating results of relating the real part and imaginary part of the intensity distribution of the interference fringes 51 and 52 of reflected light, which has interference occurring on an image detector of the ellipsometer 5 according to Embodiment 5, with the wavelength of the illumination light L10, wherein the intensity distribution of the interference fringes 51 and 52 has undergone a Fourier transform. At this time, the real part of the intensity distribution of each of the interference fringes 51 and 52, which has undergone a Fourier transform, may indicate an amplitude, and the imaginary part thereof may indicate a phase.

As shown in FIGS. 23 through 25, an intensity distribution $I_{fringe3}$ of the reflected light R11 in the interference fringe 51 may be fitted to Equation 3 below. An intensity distribution $I_{fringe4}$ of the reflected light R13 in the interference fringe 52 may be fitted to Equation 4 below.

[Equation 3]

$$I_{fringe3} = |E_S|^2 + |E_{P+S}|^2 + 2|E_S||E_{P+S}|\exp\{i(\delta_S - \delta_{P+S})\} \quad (3)$$
$$= |E_S|^2 + |E_{P+S}|^2 + 2|E_S||E_{P+S}|\exp(i\Delta_{S-PS})$$

-continued

[Equation 4]

$$I_{fringe4} = |E_P|^2 + |E_{P+S}|^2 + 2|E_P||E_{P+S}|\exp\{i(\delta_P - \delta_{P+S})\} \quad (4)$$

$$= |E_P|^2 + |E_{P+S}|^2 + 2|E_P||E_{P+S}|\exp(i\Delta_{P\_PS})$$

$E_{P+S}$ in Equations 3 and 4 may be defined as Equation 5.

[Equation 5]

$$E_{P+S} = E_p + E_S \quad (5)$$

Terms of exp, i.e., $2|E_P| |E_{P+S}|\exp(i\Delta_{S\_PS})$ in Equation 3 and $2|E_P| |E_{P+S}|\exp(i\Delta_{P\_PS})$ in Equation 4, correspond to AC components. When the intensity distribution $I_{fringe3}$ of the reflected light R11 in the interference fringe 51 is fitted to Equation 3, the amplitude $\Psi_1 (=2|E_P| |E_{P+S}|)$ and the phase $\Delta_{S\_PS}$ may be obtained by performing a Fourier transform on the intensity distribution $I_{fringe3}$. In addition, the amplitude $\Psi_2 (=2|E_P| |E_{P+S}|)$ and the phase $\Delta_{P\_PS}$ may be obtained by performing a Fourier transform on the intensity distribution $I_{fringe4}$.

The phase $\Delta$ corresponding to the ellipsometry $\Delta$ may be obtained by calculating the sum of the phase $\Delta_{S\_PS}$ and the phase $\Delta_{P\_PS}$. The amplitude $\Psi$ may be calculated by dividing the amplitude $\Psi_1$ by the amplitude $\Psi_2$. In other words, $|E_P|/|E_S|$ corresponding to ellipsometry $\Psi$ may be calculated from an amplitude $\Psi_1/\Psi_2 = \tan^{-1}\Psi$. As described above, the analysis system 60 may perform a Fourier transform on the interference fringes 51 and 52 and calculate the ellipsometric parameters $\Psi$ and $\Delta$ from the interference fringes 51 and 52 that have undergone a Fourier transform. In addition, the analysis system 60 may obtain information about the total amount of light.

In the present embodiment, Nomarski prisms are not necessary for the polarizing optical elements 31 and 32. Accordingly, the design freedom of an optical device may be increased. In addition, the analysis system 60 may use both of the interference fringes 51 and 52. As a result, four kinds of information, i.e., the ellipsometric parameters $\Psi$ and $\Delta$ and, the total amount of light, and the degree of polarization, may be obtained. Other configurations and effects of the ellipsometer 5 are included in the descriptions of Embodiments 1 through 4.

While the inventive concept has been particularly shown and described with reference to embodiments thereof, it will be understood that various changes in form and details may be made therein without departing from the scope of the following claims.

What is claimed is:

1. An ellipsometer comprising:
a lens configured to transmit reflected light generated when illumination light is incident on a measurement surface of a sample, wherein the illumination light is linearly polarized, and the reflected light comprises a first polarization component in a first polarization state on the measurement surface and a second polarization component in a second polarization state on the measurement surface, wherein the second polarization state is different from the first polarization state;
a first separation unit configured to separate the reflected light into a first separate reflected light and a second separate reflected light, the first separate reflected light comprising the first polarization component and the second polarization component, and the second separate reflected light comprising the first polarization component and the second polarization component;
a first polarizing optical element configured to separate the first separate reflected light into a first linearly polarized light that is polarized in a first polarization direction and a second linearly polarized light that is polarized in a second polarization direction that is perpendicular to the first polarization direction;
a first interference device configured to form a first interference fringe by allowing components of the first linearly polarized light and the second linearly polarized light that have different polarization directions from the first and second polarization directions to interfere with each other;
a second separation unit configured to separate the second separate reflected light into a third separate reflected light and a fourth separate reflected light, the third separate reflected light comprising the first polarization component, and the fourth separate reflected light comprising the second polarization component;
a second polarizing optical element configured to separate the third separate reflected light into a third linearly polarized light that is polarized in a third polarization direction and a fourth linearly polarized light that is polarized in a fourth polarization direction that is perpendicular to the third polarization direction;
a second interference device configured to form a second interference fringe by allowing components of the third linearly polarized light and the fourth linearly polarized light that have different polarization directions from the third and fourth polarization directions to interfere with each other;
an image detector configured to detect the first interference fringe and the second interference fringe; and
an analysis system configured to calculate ellipsometric parameters $\Psi$ and $\Delta$ from the first interference fringe and the second interference fringe.

2. The ellipsometer of claim 1, further comprising a wave plate configured to convert the first polarization component of the third separate reflected light into a third polarization state different from both the first polarization state and the second polarization state.

3. The ellipsometer of claim 1, further comprising:
a light source configured to generate the illumination light;
a polarizer configured to change the illumination light of the light source with linear polarization in one direction; and
an illumination lens configured to illuminate the measurement surface with the illumination light with the linear polarization in the one direction.

4. The ellipsometer of claim 3, wherein an optical axis of the illumination light incident onto the measurement surface and an optical axis of the reflected light from the measurement surface are oblique to a direction normal to the measurement surface.

5. The ellipsometer of claim 3, wherein the illumination lens is configured to focus the illumination light, and wherein the image detector is located at a pupil position of the lens and a conjugate pupil position of the lens.

6. The ellipsometer of claim 1, further comprising:
a light source configured to generate the illumination light;
a polarizer configured to linearly polarize the illumination light in one direction; and
an objective lens configured to illuminate the measurement surface with the linearly polarized illumination light with linear polarization and transmit the reflected light generated when the illumination light is reflected from the measurement surface.

7. The ellipsometer of claim 6, wherein an optical axis of the illumination light incident onto the measurement surface and an optical axis of the reflected light from the measurement surface are orthogonal to the measurement surface.

8. The ellipsometer of claim 6, wherein the objective lens is configured to focus the illumination light, and wherein the image detector is located at a pupil position of the objective lens and a conjugate pupil position of the lens.

9. The ellipsometer of claim 1, wherein each of the first polarizing optical element and the second polarizing optical element comprises a Nomarski prism.

10. The ellipsometer of claim 9, wherein the first polarizing optical element comprises a plurality of sections, each of the plurality of sections having a division angle obtained by equally dividing an angle of a single rotation around an optical axis of the reflected light on a plane orthogonal to the optical axis of the reflected light by a number of the plurality of sections, and wherein each of the plurality of sections is configured to separate the first linearly polarized light and the second linearly polarized light in a direction orthogonal to a bisector of the division angle.

11. The ellipsometer of claim 1, wherein the illumination light comprises white light, and
the analysis system is further configured to perform a Fourier transform on the first interference fringe and the second interference fringe and calculate the ellipsometric parameters $\Psi$ and $\Delta$ from the first and second interference fringes that have undergone the Fourier transform.

12. The ellipsometer of claim 1, wherein the first polarization state is s-polarization on the measurement surface, and wherein the second polarization component is p-polarization on the measurement surface.

13. The ellipsometer of claim 1, wherein the second separation unit comprises a polarizing beam splitter film.

14. The ellipsometer of claim 1, wherein the second separation unit comprises a mirror and a polarizing plate.

15. The ellipsometer of claim 1, wherein the first separation unit comprises a non-polarizing beam splitter film, wherein the second separation unit comprises a polarizing beam splitter film, and wherein the non-polarizing beam splitter film is parallel with the polarizing beam splitter film.

16. The ellipsometer of claim 1, wherein the first separation unit comprises a non-polarizing beam splitter film,
the second separation unit comprises a polarizing beam splitter film, and
the first separation unit and the second separation unit are integrated into a transparent optical element having a triangular prism shape,
wherein the triangular prism shape of the transparent optical element comprises an entry plane on which the reflected light is incident thereto, an exit plane from which the first separate reflected light and the second separate reflected light are output, and a reflective plane from which the second separate reflected light is reflected,
the polarizing beam splitter film is on an inside area of the reflective plane, and
the non-polarizing beam splitter film is on a plane bisecting an angle between the entry plane and the reflective plane.

17. The ellipsometer of claim 1, wherein the first interference device comprises a first polarizing plate configured to transmit light with a polarization component having a polarization direction different from the first polarization direction of the first linearly polarized light and the second polarization direction of the second linearly polarized light, and wherein the second interference device comprises a second polarizing plate configured to transmit light with a polarization component having a polarization direction different from the third polarization direction of the third linearly polarized light and the fourth polarization direction of the fourth linearly polarized light.

18. The ellipsometer of claim 1, wherein the first interference device and the second interference device are integrated into a third interference device,
wherein the third interference device comprises a polarizing beam splitter configured to:
reflect the components of the first linearly polarized light to have a polarization direction different from the first polarization direction,
reflect the components of the second linearly polarized light to have a polarization direction different from the second polarization direction,
reflect the components of the third linearly polarized light to have a polarization direction different from the third polarization direction,
reflect the components of the fourth linearly polarized light to have a polarization direction different from the fourth polarization direction, transmit the components of the first linearly polarized light with a polarization direction orthogonal to the direction different from the first polarization direction,
transmit the components of the second linearly polarized light with a polarization direction orthogonal to the direction different from the second polarization direction,
transmit the components of the third linearly polarized light with a polarization direction orthogonal to the direction different from the third polarization direction,
transmit the components of the fourth linearly polarized light with a polarization direction orthogonal to the direction different from the fourth polarization direction, and
wherein the image detector comprises a first image detector configured to detect the first interference fringe of the components reflected from the polarizing beam splitter and a second image detector configured to detect the second interference fringe of the components transmitted by the polarizing beam splitter.

19. An ellipsometer comprising:
a lens configured to transmit reflected light generated when illumination light is incident on a measurement surface of a sample, wherein the illumination light is linearly polarized;
a first separation unit configured to separate the reflected light into a first separate reflected light and a second separate reflected light in a same polarization state;
a first polarizing optical element configured to separate the first separate reflected light into a first linearly polarized light that is polarized in a first polarization direction and a second linearly polarized light that is polarized in a second polarization direction that is perpendicular to the first polarization direction;
a first interference device configured to form a first interference fringe by allowing components of the first linearly polarized light and the second linearly polarized light that have different polarization directions from the first and second polarization directions to interfere with each other;

a second separation unit configured to separate the second separate reflected light into a third separate reflected light and a fourth separate reflected light respectively in orthogonal polarization states;

a second polarizing optical element configured to separate the third separate reflected light into a third linearly polarized light that is polarized in a third polarization direction and a fourth linearly polarized light that is polarized in a fourth polarization direction that is perpendicular to the third polarization direction;

a second interference device configured to form a second interference fringe by allowing components of the third linearly polarized light and the fourth linearly polarized light that have different polarization directions from the third and fourth polarization directions to interfere with each other;

an image detector configured to detect the first interference fringe and the second interference fringe; and an analysis system configured to calculate ellipsometric parameters $\Psi$ and $\Delta$ from the first interference fringe and the second interference fringe.

20. An ellipsometer comprising:

a lens configured to transmit reflected light generated when illumination light with linear polarization is incident on a measurement surface of a sample, the reflected light comprising a first polarization component that is polarized in a first direction and a second polarization component that is polarized in a second direction on the measurement surface, wherein the second direction is different from the first direction;

a first separation unit configured to separate the reflected light into a first separate reflected light and a second separate reflected light, wherein the first separate reflected light comprises the first polarization component and the second polarization component, and wherein the second separate reflected light comprises the first polarization component and the second polarization component;

a first mirror configured to reflect the first separate reflected light;

a second mirror configured to reflect the second separate reflected light;

a wave plate configured to convert the first polarization component of the second separate reflected light that has been reflected from the second mirror, into a third polarization component in a third direction that is different from the first and second directions and convert the second polarization component of the second separate reflected light into a fourth polarization component in a fourth direction that is different from the first, second, and third directions;

a second separation unit configured to reflect the first polarization component of the first separate reflected light that has been reflected from the first mirror, transmit the second polarization component of the first separate reflected light, and transmit the third and fourth polarization components of the second separate reflected light that has been transmitted by the wave plate;

a third separation unit configured to reflect the second polarization component of the first separate reflected light that has been transmitted by the second separation unit and reflect the third and fourth polarization components of the second separate reflected light that has been transmitted by the second separation unit;

a first interference device having a first transmission axis and configured to form a first interference fringe by allowing the first polarization component reflected from the second separation unit to interfere with a first transmission axis component of each of the third and fourth polarization components transmitted by the second separation unit;

a second interference device having a second transmission axis and configured to form a second interference fringe by allowing second transmission axis components of the second, third and fourth polarization components reflected from the third separation unit to interfere with one another;

an image detector configured to detect the first interference fringe and the second interference fringe; and an analysis system configured to calculate ellipsometric parameters $\Psi$ and $\Delta$ from the first interference fringe and the second interference fringe.

\* \* \* \* \*